(12) United States Patent
Seiler et al.

(10) Patent No.: US 10,964,088 B2
(45) Date of Patent: Mar. 30, 2021

(54) MIPMAP WITH MIXED TEXTURE TYPES

(71) Applicant: Facebook Technologies, LLC, Menlo Park, CA (US)

(72) Inventors: Larry Seiler, Redmond, WA (US); Alexander Nankervis, Seattle, WA (US); John Adrian Arthur Johnston, San Mateo, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/583,924

(22) Filed: Sep. 26, 2019

(65) Prior Publication Data

US 2020/0134880 A1 Apr. 30, 2020

Related U.S. Application Data

(60) Provisional application No. 62/753,676, filed on Oct. 31, 2018.

(51) Int. Cl.
| | |
|---|---|
| *G06T 15/04* | (2011.01) |
| *G06T 15/50* | (2011.01) |
| *G06T 7/90* | (2017.01) |
| *G06T 11/00* | (2006.01) |
| *G06T 11/60* | (2006.01) |

(52) U.S. Cl.
CPC ............ *G06T 15/04* (2013.01); *G06T 7/90* (2017.01); *G06T 11/001* (2013.01); *G06T 11/60* (2013.01); *G06T 15/50* (2013.01)

(58) Field of Classification Search
CPC ......... G06T 15/04; G06T 7/90; G06T 11/001; G06T 11/60; G06T 15/50
See application file for complete search history.

(56) References Cited

U.S. PATENT DOCUMENTS

| | | | | |
|---|---|---|---|---|
| 10,140,736 | B2* | 11/2018 | Doran | ............... G06T 11/203 |
| 10,395,408 | B1* | 8/2019 | Noel | ............... G06T 15/04 |
| 2004/0189662 | A1 | 9/2004 | Frisken | |
| 2010/0271382 | A1* | 10/2010 | Kato | ............... G06T 11/203 |
| | | | | 345/582 |

OTHER PUBLICATIONS

International Search Report and Written Opinion for International Application No. PCT/US2019/058315, dated Jan. 2, 2020.
Green, Improved alpha-tested magnification for vector textures and special effects, Advanced Real-Time Rendering in 3D Graphics and Games Course—Siggraph 2007, Chapter 2, pp. 9-18, 2007.
Chlumky, et al., Improved Corners with Multi-Channel Signed Distance Fields, Computer Graphics Forum, 37(1):273-287, 2017.

* cited by examiner

*Primary Examiner* — Antonio A Caschera
(74) *Attorney, Agent, or Firm* — Baker Botts L.L.P.

(57) ABSTRACT

In one embodiment, a method for computing a color value for a sampling pixel region includes using a computing system to determine a sampling pixel region within a texture. The texture is associated with mipmap levels having different resolutions of the texture. The mipmap levels include at least a first mipmap level defined by color texels and a second mipmap level defined by distance-field texels. The system may select one of the mipmap levels based on a size of the sampling pixel region and a size of a texel in the selected mipmap level. The system may then compute a color value for the sampling pixel region using the selected mipmap level.

20 Claims, 16 Drawing Sheets

| Index (2-bit) | Color |
|---|---|
| 0 | Transparent |
| 1 | Red |
| 2 | Green |
| 3 | Blue |

| Index (4-bit) | Color |
|---|---|
| 0 | Transparent |
| 1 | Red |
| 2 | Green |
| 3 | Blue |
| ⋮ | ⋮ |
| 15 | Color15 |

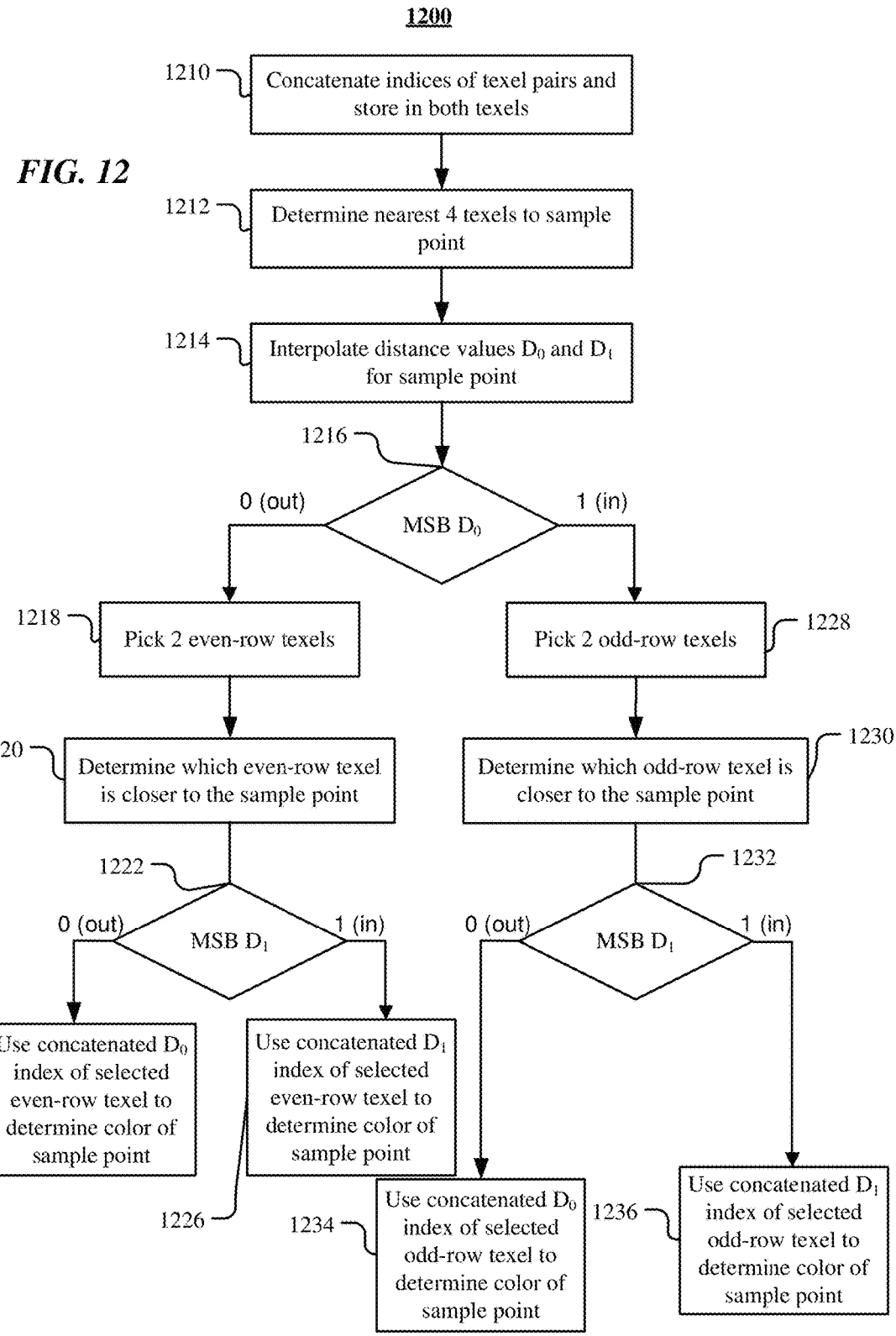

MIPMAP WITH MIXED TEXTURE TYPES

PRIORITY

This application claims the benefit, under 35 U.S.C. § 119(e), of U.S. Provisional Patent Application No. 62/753,676, filed 31 Oct. 2018, which is incorporated herein by reference.

TECHNICAL FIELD

This disclosure generally relates to text rendering in real-time computer graphics for augmented reality and/or virtual reality environments.

BACKGROUND

Computer graphics, in general, are visual scenes created using computers. Three-dimensional (3D) computer graphics provide users with views of 3D objects from particular viewpoints. Each object in a 3D scene (e.g., a teapot, house, person, etc.) may be defined in a 3D modeling space using basic geometries. For example, a cylindrical object may be modeled using a cylindrical tube and top and bottom circular lids. The cylindrical tube and the circular lids may each be represented by a network or mesh of smaller polygons (e.g., triangles). Each polygon may, in turn, be stored based on the coordinates of their respective vertices in the 3D modeling space.

Even though 3D objects in computer graphics may be modeled in three dimensions, they are conventionally presented to viewers through rectangular two-dimensional (2D) displays, such as computer or television monitors. Due to limitations of the visual perception system of humans, humans expect to perceive the world from roughly the same vantage point at any instant. In other words, humans expect that certain portions of a 3D object would be visible and other portions would be hidden from view. Thus, for each 3D scene, a computer-graphics system may only need to render portions of the scene that are visible to the user and not the rest. This allows the system to drastically reduce the amount of computation needed.

One problem in computer graphics is efficient and high-quality rendering of 2D graphics (e.g., images consisting of solid color regions, as distinct from 3D graphics, which typically contains shaded or patterned regions). 2D graphics may be placed in a 3D scene and observed from any viewpoint, which causes the original 2D graphics to appear distorted. When generating a scene for a display, a rendering system typically samples the 2D graphics from the viewpoint of the user/camera to determine the appropriate color that should be displayed by the pixels of the screen. The color to be displayed by a pixel is typically determined using a filtering technique, such as bilinear interpolation, that estimates the color based on multiple color information in the 2D graphic near a corresponding sampling point. Since multiple color information is used to estimate the color of a single pixel, edges of the rendered graphic would appear blurry or less sharp. The goals for addressing the aforementioned problem for 2D graphics can be characterized as: (1) defining a more compact way to represent 2D graphics images, and (2) defining a way to have crisp edges between the solid color regions despite the resample filtering that is required in many graphics applications, such as augmented and virtual reality, to accommodate geometric distortions, which normally causes blurring.

These problems are particularly acute when rendering text, which requires rendering fine edge details between the text and background regions. When the text is static, it is not a problem to take time and computational resources to pre-render it with high precision. For example, a character may be stored as a texture with color data (e.g., red, green, and blue) per texel and, when needed, rendered onto a screen. The character may look reasonably good when it is small, but pixilation and aliasing may become more pronounced if it is magnified, rotated, or distorted (e.g., due to changes in transformation, perspective, or the text itself changes). To improve a font's appearance and sharpness when rendered, a specialized technique must be used, such as a technique that stores the character shapes (e.g., glyphs) in structures called signed distance fields.

SUMMARY OF PARTICULAR EMBODIMENTS

Embodiments described herein address the problems related to graphics rendering, as discussed above. Particular embodiments relate to using distance field labels ("labels," as used herein, refers to characters, fonts, glyphs, icons, and other 2D images consisting of solid color regions) to support more complex label patterns, such as those requiring more than two color patterns rather than just the binary color scheme (e.g., background and foreground) supported by traditional distance field techniques. Since text is an example of a particularly difficult and common problem that could be solved by the present disclosure, text will be used as the primary example to illustrate the various techniques described. However, it should be noted that the techniques described herein could apply to different types of labels, including icons and other 2D images.

In particular embodiments, when sampling points on a particular surface, the distance field of a particular sampled point may be computed using bilinear interpolation of the distance fields of the four nearest texels. The sampled distance field may indicate whether the sampling point falls "in" or "out" of the label (e.g., in the body of the text or out in the background). Then, the next step may be to select the color index encoded within the four texels. Two of the four texels may encode the color for "in" and the other two texels encode the color for "out." In particular embodiments, if the sampled distance field is determined to be "out," then the index of one of the two "out" texels that is closest to the sampled point would be used. Similarly, if the sampled distance field is determined "in," then the index of the closer "in" texel would be used.

Particular embodiments described here relate to using dual distance field labels based on a set of distances for four interleaved indices. Dual distance fields are used to support complex shapes that have sharp convex inner and outer corners. In particular embodiments, using single distance fields based on the distance to only one edge may result in corners not being reconstructed correctly, and instead look rounded or chipped in the resulting image. A solution to this is to use dual distance fields that are based on distances to two different types of edges. An ambiguity introduced by dual distance fields is that, at edge intersections, there could be four different regions associated with four different combinations of being inside or outside of each of the edges. Particular embodiments enable dual distance field labels to encode the color that should be used in each inside/outside scenario (e.g., if a sampling point falls in a region that is inside both edges, it should be painted red; if a sampling point falls in a region that is inside of one edge and outside of the other edge, it should be painted purple, etc.). Each dual distance field label, as the name suggests, has two distance fields: distance0 (e.g., the distance to type0 edge) and distance1 (e.g., the distance to type1 edge). The two distance fields of each label may encode two respective color indices. A pair of dual distance field labels, therefore, may be used to encode four indices, one for each "in" and "out" combination. Then, once the four combinations of "in" and "out" are determined in relation to each of the two different edge types, an index can be accessed that is specified for each "in/out" combination in order to determine the color look-up table entry to use to label the color of a sample point.

Particular embodiments described here relate to using distance field optimization techniques. As a first example, to minimize undesirable pixilation and/or aliasing effects, a mipmap may be used to accommodate different pixel sampling sizes. Mipmap is a technique of scaling an original high-resolution texture map and pre-filtering the texture map into multiple resolutions, which may be selectively used during rendering based on the relative sizes between texture texels and sampling pixels. With distance fields, when the distance between two edges is below two texels, there would only be at most a single texel between the edges. As such, there is an inherent ambiguity as to which edge the distance value of that texel measures. To address this issue, particular embodiments may configure a mipmap chain of a label to have both distance field textures and RGBA textures. Distance field textures may be used when larger resolution textures are needed, and RGBA textures may be used when smaller textures are needed. The inferior quality of a RGBA texture would not be prominent since its screen coverage would be small. As a second example of distance-field optimization, comparison of the most significant bit can be done to eliminate interpolations in situations where it is not needed. As a third example of distance field optimization, transparent results may be detected so that the corresponding pixel can be discarded.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 12 illustrates an example method for using the coarse grain color index to determine the color of a sample position using dual distance fields.

DESCRIPTION OF EXAMPLE EMBODIMENTS

Figure 1:
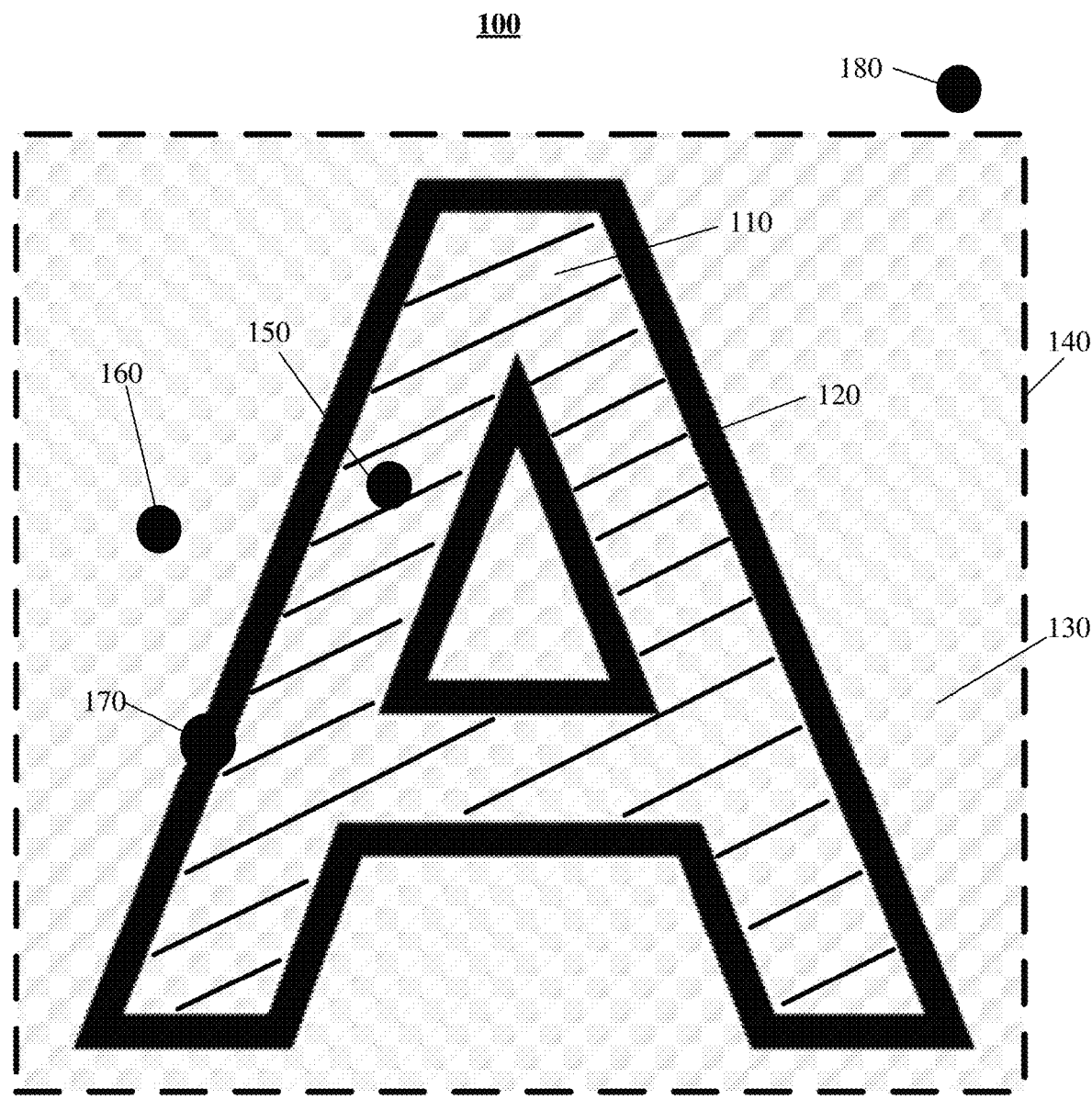
FIG. 1 an example distance field label with various sample positions placed inside and outside the edges of a character shape.

This application describes techniques for text rendering in computer graphics when the transformation, perspective, or the text itself may change dynamically in real-time, such as in situations of text rendering (or the rendering of other types of labels, such as icons, glyphs, 2D images, etc.) in augmented reality (AR) and virtual reality (VR). One example technique used in real-time graphics rendering relies on storing the character shapes (e.g., glyphs) in structures called signed distance fields, or simply distance fields. In general, a distance field is the result of a signed distance transformation applied to a subset of N-dimensional space, which is a vector shape that is to be rendered (e.g., text, icons, etc.). The distance field maps each point P of the space to a scalar signed distance value. A signed distance may be defined as follows: If the point P belongs to the subset (e.g., if the point P is within the text or icon to be rendered), the signed distance is the positive minimum distance to the closest edge of the shape of the subset. This is also referred to as being "inside" or "in," and may be encoded by having the most significant bit (MSB) of an m-bit distance field be 1. If it does not belong to the subset (e.g., if the point P is outside the text or icon to be rendered), the signed distance is the negative distance to the closest edge of the shape of the subset. This is also referred to as being "outside" or "out," and may be encoded by having the MSB of an m-bit distance field be 0. The distance field may use Euclidean distances whose domain is two-dimensional space only.

Generally, particular embodiments of display engines for driving AR and/or VR displays are fed data to display and perform distortion, resampling, composition, and color correction necessary to adjust for the characteristics of the AR/VR display device (e.g., a device used by or worn by a user). Each frame of a scene displayed to the user is generated based on the current head position, current eye position, current eye movement, other relevant positions of the user, or any combination thereof. The details of the scene of each frame may be generated by performing bilinear interpolations on surfaces that are generated based on the rendering results of a standard computer processing unit (CPU) or graphics processing unit (GPU). A surface may be a rectangular texture map with a transformation matrix to specify its location in the scene. The fundamental unit of the texture map is a texel (also known as texture element or texture pixel), and the texture map includes arrays of texels representing a particular texture space. In particular, there are two types of surfaces: images surfaces and label surfaces. Image surfaces may have textures that store RGB (red-green-blue color spaces) or RGBA (red-green-blue-alpha color spaces) components per texel and are used to render shaded images (e.g., video frames or scenes rendered by a GPU). Label surfaces may have textures that store signed distances and color indices and are used to render objects that consist of solid color regions, which includes text such as letters, numbers, characters, etc., in addition to icons. Unlike RGBA labels, distance field labels are not susceptible to blurry edges caused by interpolation operations. Particular embodiments described herein will focus on techniques associated with label surfaces.

Currently, distance field labels are restricted to two colors, such as black text or foreground with white background and/or cutouts, or vice versa. As such, to support more complex label color patterns, the embodiments discussed herein describe how an improved distance field label can support more than two colors. In particular embodiments, an 8-bit texel may be encoded with (1) a distance field stored on 6 bits of the texel and (2) a color index (e.g., a value indicating a desired color or, conceptually, a pointer to an entry in a color look-up table) stored on the remaining 2 bits of the texel. For example, the 8-bit texel may be used to define a white text with a transparent background (e.g., with color index 0) that allows other objects positioned behind the text to be seen. The number of bits allocated to the index dictates how many colors could be supported by the label. For example, an index of 2 bits allows for the selection of up to four unique colors (e.g., transparent, orange, yellow, and purple). The embodiments described herein also contemplate concatenating the indices of two texels to form an index with more bits. For example, by concatenating the 2-bit indices of two texels, a 4-bit index may be formed, which allows for the selection of up to sixteen unique colors (e.g., one transparent color and fifteen colors). The color indices are used to look up an RGBA color depending on the high order bit of the interpolated distance, as discussed in more detail below.

Using Single Distance Fields to Determine Color of a Sample Position

Particular embodiments described herein are directed to texels that each have a single distance field. At a high level, distance fields are used to indicate the location of edges between solid-color regions (e.g., foreground and background) on label surfaces. Each texel stores a representation of the distance of the texel center to the nearest edge, bounded by a maximum distance, beyond which a texel is determined to be outside a particular array. In particular embodiments, 6-bits may be allocated for indicating the distance value, with the MSB representing whether the texel center is "in" (e.g., represented by 1) or "out" (e.g., represented by 0). If the texel is far away from an edge, the remaining 5-bits would be a large value; conversely, if the texel is close to an edge, the remaining 5-bits would be small. In particular embodiments, for a sample position P, bilinear interpolation of the distance fields of the four closest texels can be used to determine which side of the edge the sample position P is on. As an example, a zero (0) in the high order bit (e.g., the MSB) of the interpolated distance indicates that the sample position P is outside the region defined by the edge and a one (1) in the high order bit of the interpolated distance indicates that the sample position P is inside the region defined by the edge. Notably, the distance fields in particular embodiments described herein may be unsigned numbers, so that the lowest value is zero and no value encodes a position exactly on the edge. This is in contrast to other distance fields encoded using signed values (e.g., the MSB of a distance field may represent whether the value is positive or negative, which corresponds to "in" or "out," or zero, which corresponds to "on edge"). The unsigned distance field encoding is beneficial because it avoids certain issues, such as when an edge passes through the center of a texel.

As discussed above, each texel of a label texture may include both a distance and a color index value. The color index values are used to select an entry in a color look-up table that can be customized for each label. For a given sample position, which texel's color index to select depends on the interpolated distance of the sample position (e.g., whether its MSB=0 (out) or MSB=1 (in)) and the location of the sample position in texture space relative to the nearby texels. In particular embodiments, each label surface specifies a base address into the color table and a control bit that selects whether the surface uses a single set of color table entries for each combination of in and out edges, or whether each combination uses a different set of color table entries.

Each color index selects a color for all samples within a given region in the texture, rather than just for the texel that it is stored with. For single distance labels, two interleaved color indices specify the color to use when the MSB of the interpolated distance is zero (out) or one (in). For dual distance labels, four interleaved color indices specify the color to use for the four combinations of the MSB of the two interpolated distances.

Certain situations merit additional consideration. As an example, to determine which edge a texel is on when the edge passes directly through the center of the texel (e.g., when the distance is zero), a "top left" rule may be used in which a pixel that falls on an edge is included if the inside of the object is to the right of the pixel, or, for a horizontal edge, if the inside of the object is below the pixel. As another example, all texels outside the array are treated as having distances of zero and indices of zero. As a result, any sample position that is more than 0.5 texel outside the grid of distance texels results in MSB=0 (out) for all edges and produces an index of zero. The first color table entry for each surface is typically set to transparent (i.e., no color). As such, nothing is rendered for sample positions more than 0.5 texel outside the array.

FIG. 1 illustrates an example texel array 100 with various sample positions placed inside and outside the edges of a character shape 110. The character shape 110 illustrates an "A" in which an edge 120 separates a color of the character shape 110 (e.g., the shaded region) from a color of the background 130. Texels (not shown for simplicity) within the shaded region are encoded with distance values indicating that they are "in" (with MSB=1) whereas texels outside of the shaded region are encoded with distance values indicating that they are "out" (with MSB=0). In addition, boundary 140 delineates the background 130 from the region beyond the array texel 100. Various sample points are shown, including sample point 150 located inside the region defined by the edge 120 of the character shape 110, sample point 160 located outside the region defined by the edge 120 of the character shape 110, sample point 170 located on the edge 120 of the character shape 110, and sample 180 located outside of the boundary 140 of the texel array 100.

As will be discussed in more detail below, linear interpolation of the unsigned distance functions of the four nearest texels for each of sample points 150, 160 would determine that sample point 150's interpolated distance has an MSB=1 (in) and sample point 160's interpolated distance has an MSB=0 (out). In addition, linear interpolation of the distance functions of the four nearest texels for sample point 170 would determine that the interpolated distance is exactly half the range of the unsigned distance field, which indicates that the sample point 170 is directly on the edge 120 (if the distance field is signed rather than unsigned, the "on edge" scenario would be represented by an interpolated distance of 0). The color for sample point 170 would thus be determined based on the "top left" rule. Moreover, sample point 180 would be determined to be outside of the texel array 100 and thus have a unsigned distance of zero and an index of zero associated with a no color, or "transparent" result.

In particular embodiment, there may be two ways that colors indices are specified. The first method allows finer grain color selection from four colors, the first of which is transparent. For example, as mentioned above, a texel may be represented by 8-bits, with 6-bits encoding the distance field and 2-bits encoding the color index. The 2-bit color index can be mapped to four colors. Although this example allocates particular number of bits to encode the distance field and color index, a person of ordinary skill in the art would recognize that any other allocation of bits may be used instead (e.g., 7, 8, 9, or 20 bits to encode the distance field and 1, 4, 6, or 10 bits to encode the color index). For instance, a second method described herein may have coarser grain color selection and allows for sixteen color options, the first of which is transparent. The two methods are described as having "fine grain" and "coarse grain" in the sense that the size of the texture region dictated by a set of color indices in the "fine grain" method is smaller than that of the "coarse grain" method. Each of these methods will be discussed in detail below.

Single Distance Field Fine Grain Color Selection

Figure 2A:
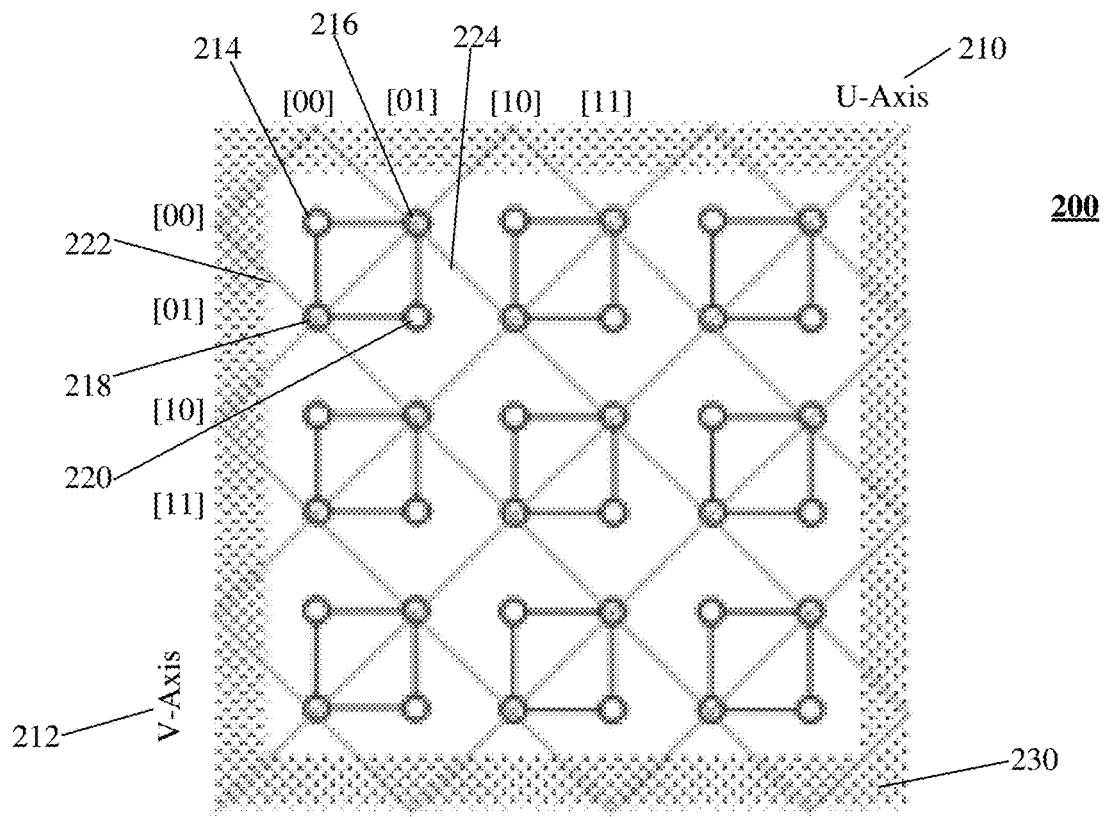
FIGS. 2A and 2B illustrate example diagrams of even and odd texel locations, respectively, on an array of texels for fine grain color index selection.
Figure 2B:
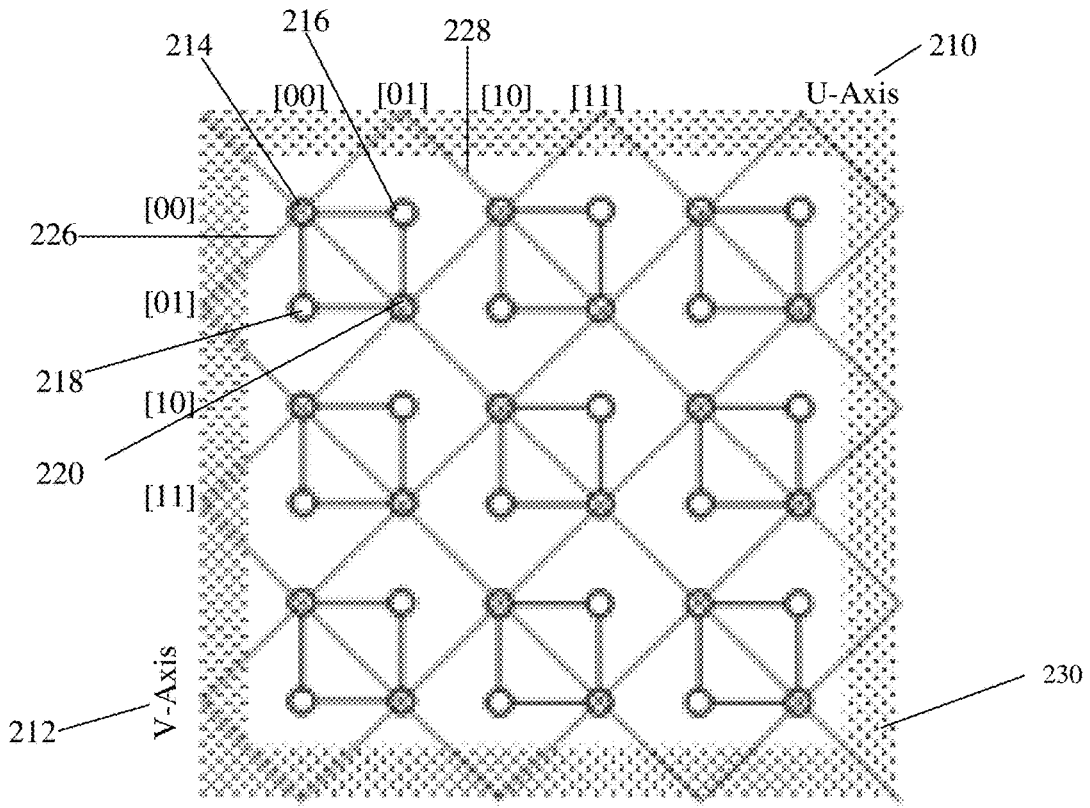
Figures 3A, 3B:
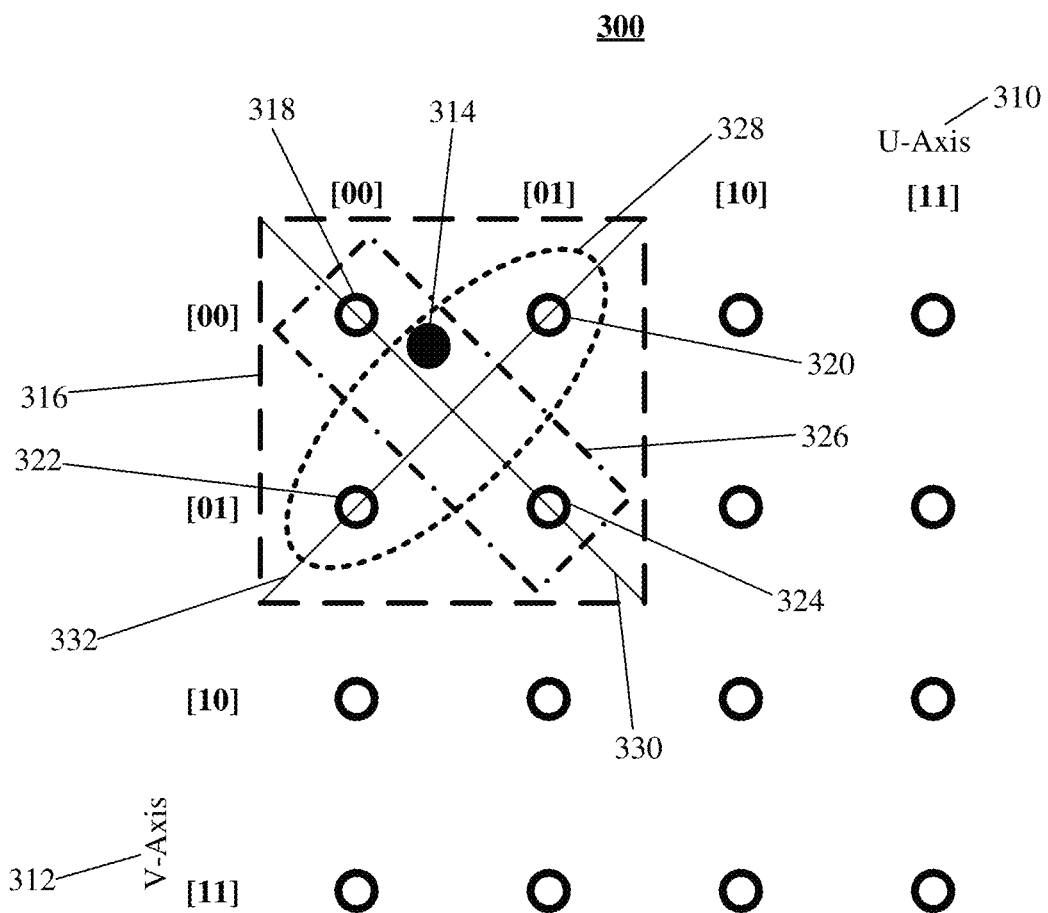
FIG. 3A illustrates using a fine grain color index selection method on an array of texels associated with single distance fields.
FIG. 3B illustrates an example color look-up table for use with the fine grain color index selection.
Figure 4:
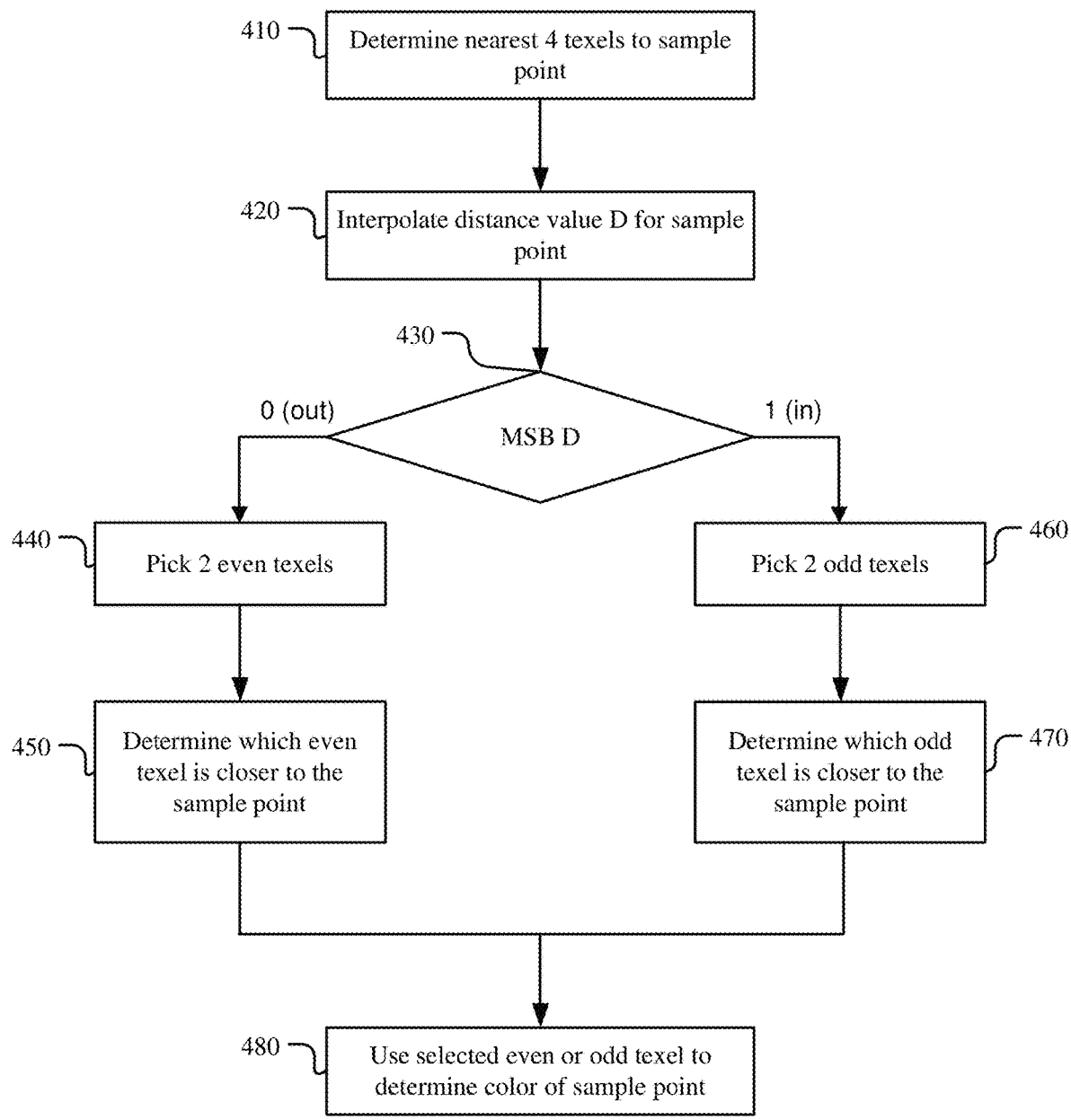
FIG. 4 illustrates an example method for using the fine grain color index to determine the color of a sample position using single distance fields.

The discussion of the fine grain color selection method for single distance field labels will focus on the embodiment shown in FIGS. 2A, 2B, 3A, 3B, and the method described in FIG. 4. Briefly, FIGS. 2A and 2B illustrate example diagrams of even and odd texel locations, respectively, on an array 200 of texels for fine grain color index selection. FIG. 3A illustrates using a fine grain color index selection method on the array 300 of texels associated with single distance fields. FIG. 3B illustrates an example color look-up table for use with the fine grain color index selection. In addition, FIG. 4 illustrates an example method 400 for using the fine grain color index to determine the color of a sample position using texels with single distance fields.

FIGS. 2A and 2B illustrate an example six-by-six array 200 of texels in which the texels located at even or odd positions, respectively, are depicted at the center of the diamond-shaped regions. The texels in the array 200 are arranged in a texture map at positions on a U-axis 210 and a V-axis 212 coordinate system. The circles represent the center of texel positions on array 200. In embodiments where texel sampling is performed by hardware, the coordinate may be specified using binary values. For example, Rows 0-3 along the V-axis 212 are respectively referred to as Rows 00, 01, 10, and 11, and Columns 0-3 along the U-axis 210 are respectively referred to as Columns 00, 01, 10, and 11 (for simplicity, the additional Rows and Columns are not referenced, as doing so will add to the number of bits to refer to them). Texel 214, for example, is located at u=00 and v=00 (or (00, 00)); texel 216 is located (00, 01), texel 218 is located at (01, 00), texel 220 is located at (01, 01) and so on. For simplicity, only the first four rows and the first four columns of the six-by-six array 200 are referenced here.

For fine grain color index selection, the texels in the array 200 are sorted into even or odd positions (i.e., "even" texels or "odd" texels) in order to determine which texel to use to look up the color associated with a region. In particular embodiments, texels in array 200 are determined to be either even or odd based on whether the lowest order bit (e.g., least significant bit LSB) of the U and V coordinates associated with the texel are the same digit. As an example, texel 214 is located at the U-V coordinates of u=00 and v=00, and since the U-coordinate and V-coordinate have the same last digit (i.e., "0"), texel 216 is considered to be an even texel. In addition, texel 220 is also an even texel because the U-V coordinates of u=01 and v=01 have the same last digit (i.e., "1"). Even texels, such as 214 and 220, are illustrated in FIG. 2A as being located within the diamond-shaped regions, e.g., 222 and 224, respectively. As will be described in further detail below, a sample point that falls in such a diamond-shaped region (e.g., 222) would be assigned the color specified by the color index of the texel (e.g., 214) at the center of the region, provided that the sample point is associated with the "even" texels (e.g., based on the MSB of the interpolated distance of the sample point, described in further detail below). On the other hand, texel 216 is located at the U-V coordinates of u=01 and v=00, and since the U-coordinate and V-coordinate do not have the same last digit, texel 216 is an odd texel. In addition, texel 218 is also an odd texel because the U-V coordinates of u=00 and v=01 do not have the same last digit. Odd texels, such as 216 and 218 illustrated in FIG. 2B, are located within the diamond-shaped regions, e.g., 226 and 228, respectively. As will be described in further detail below, a sample point that falls in such a diamond-shaped region (e.g., 226) would be assigned the color specified by the color index of the texel at the center of the region, provided that the sample point is associated with the "odd" texels (e.g., based on the MSB of the interpolated distance of the sample point, described in further detail below). As shown in FIGS. 2A and 2B, every two-by-two region of the array 200 includes two even texels (e.g., texels 214 and 220) and two odd texels (e.g., texels 216 and 218).

In particular embodiments, texels 214, 216, 218, and 220 are each associated with a distance field that includes a 6-bit distance and a 2-bit color index (the particular assigned bit length could vary). As discussed above, the distance field of each of texels 214, 216, 218, and 220 stores a representation of the distance from the center of the texel to the nearest edge, and the color index of each of texels 214, 216, 218, and 220 stores a reference to an entry in a color look-up table for determining the color associated with the texel. For the fine grain color selection method, the purpose of determining whether a texel is even or odd is for selecting which texels to use based on a determination of whether a sample point is outside or inside a region defined by an edge. As discussed in more detail below, if the highest order bit of the interpolated distance of sample point is 0 (i.e., MSB=0), then the sample point is determined to be outside the region defined by the edge and the pair of even texels (e.g., texels 214 and 220) are selected to determine the color of the sample. On the other hand, if the highest order bit of the interpolated distance of the sample point is 1 (i.e., MSB=1), then the sample point is determined to be inside the region defined by the edge and the pair of odd texels (e.g., texels 218 and 218) are selected to determine the color of the sample. In addition, a shaded area 230 represents locations outside the texels of array 200 (e.g., texels that are more than 0.5 texel outside the array) and thus have distances of zero and indices of zero associated with a no color, or "transparent" result.

FIG. 3A illustrates an example four-by-four array 300 of texels. Similar to the embodiment describe above in relation to FIGS. 2A and 2B, the texels in the array 300 are arranged on a texture map at positions on a U-axis 310 and V-axis 312 coordinate system. In embodiments where texel sampling is performed by hardware, the coordinates may be specified using binary-values (e.g., Rows 0-3 are respectively referred to as Rows 00, 01, 10, and 11, and Columns 0-3 are respectively referred to as Columns 00, 01, 10, 11). The circles represent texel position on array 300. Texel 318, for example, is located at u=00 and v=00 (or (00, 00)); texel 322 is located at (00, 01), and so on. A sample point P 314 is selected (e.g., based on visibility tests, such as by using ray casting to cast a ray from a pixel location onto a label surface in 3D view space and mapping that point of intersection into the texel array 300). The color to be selected for the sample point 314 is determined using the fine grain color selection method 400. As shown in FIG. 4, the method 400 may start at step 410, where the four nearest texels to the sample point 314 are determined so that the distance of those texels may be used to determine the interpolated distance of the sample point 314. FIG. 3A illustrates that the four nearest texels to sample point 314 are the texels in the two-by-two-texel region 316, and includes texels 318, 320, 322, and 324.

In particular embodiments, texels 318, 320, 322, and 324 are each associated with a distance field that includes a 6-bit distance and a 2-bit color index. As discussed above, the distance field of each of texels 318, 320, 322, and 324 stores a representation of the distance from the center of the texel to the nearest edge. In addition, the color index of each of texels 318, 320, 322, and 324 stores a reference to an entry in a color look-up table for determining the color associated with the texel. FIG. 3B illustrates an example color look-up table with four different entries. In particular examples shown, entry "0" corresponds to "transparent" (i.e., no color), entry "1" (or 01 in binary) corresponds to the color red, entry "2" (or 10 in binary) corresponds to the color green, and entry "3" (or 11 in binary) corresponds to the color blue. Thus, as an example, texel 318 may have a color index with entry "3" indicating that the texel is blue, texel 320 may have a color index with entry "3" indicating that the texel is blue, texel 322 may have a color index with entry "1" indicating that the texel is red, and texel 324 may have a color index with entry "2" indicating that the texel is green.

As shown in FIG. 4, at step 420, the distance value D for sample point 314 is interpolated based on the distance fields of each of texels 318, 320, 322, and 324. Then, at step 430, the highest order bit of the interpolated distance value D for sample point 314 is determined to be either 0 or 1. In order words, if the MSB of the interpolated distance value D for sample point 314 is determined to be 0, then sample point 314 is determined to be outside the region defined by the edge. On the other hand, if the MSB of the interpolated distance value D for sample point 314 is determined to be 1, then sample point 314 is determined to be inside the region defined by the edge.

At step 440, if it is determined that the MSB of the interpolated distance value D for sample point 314 is 0, sample point 314 is determined to be outside the region defined by the edge, and two even texels are selected from the two-by-two-texel region 316. In particular embodiments, similar to the discussion of the embodiment of FIGS. 2A and 2B, texels in array 300 are determined to be either even or odd based on whether the lowest order bit (e.g., least significant bit) of the U and V coordinates associated with the texel are the same digit. As an example, texel 318 is located at the U-V coordinates of u=00 and v=00, and since the U-coordinate and V-coordinate have the same last digit (i.e., "0"), texel 318 is considered to be an even texel. In addition, texel 324 is also an even texel because the U-V coordinates of u=01 and v=01 have the same last digit (i.e., "1"). On the other hand, texel 320 is located at the U-V coordinates of u=01 and v=00, and since the U-coordinate and V-coordinate do not have the same last digit, texel 320 is an odd texel. In addition, texel 322 is also an odd texel because the U-V coordinates of u=00 and v=01 do not have the same last digit. In other words, based on these determinations, an even texel pair 326 include texels 318, 324, and an odd texel pair 328 includes texels 320, 322.

As such, at step 440, if it is determined that the MSB of the interpolated distance value D for sample point 314 is 0, then the even texel pair 326 is selected. Once the texel pair is selected, the method 400 moves onto step 450 to determine which even texel of the even texel pair 326 is closer in distance to sample point 314. Particular embodiments of how this may be determined in hardware is as follows. In array 300 where distance is measured in texel units, the distance between two adjacent and orthogonal texel locations is one distance unit (e.g., the distance between texels 318 and 322 is 1, and the distance between texels 318 and 320 is also 1). Since the four texels in region 316 define a unit square, any point along a diagonal 332 of the unit square would have a U-axis distance and a V-axis distance that sum up to 1 unit distance. For example, a point that coincides with where texel 320 is would have a U-axis distance of 1 from the left edge of the unit square and a V-axis distance of 0 from the top edge of the unit square, resulting in a sum of 1 unit distance when its U-axis distance and V-axis distance are added together. As another example, a point in the center of the unit square would have 0.5 as both the U-axis and V-axis distances, resulting in a sum of 1 unit distance. As such, one way for hardware to determine which of the two even texels is closer to the sample point 314 is by determining, conceptually, which side of the diagonal 332 the sample point 314 falls in. For the even texel pair 326, any point on or to the left of diagonal 332 would have its U-axis and V-axis distances sum up to 1 distance unit or less (in this example, a point falling on the diagonal is being counted as being on closer to the left texel). If so, then the index of texel 326 would be deemed to be closer to the sample point 314 and, therefore, selected. Conversely, any point to the right of diagonal 332 would have its U-axis and V-axis distances sum up to greater than 1 distance unit. If so, then the index of texel 324 would be deemed to be closer to the sample point 314 and, therefore, selected.

Particular embodiments for selecting a fine index is more formally defined as follows. Let the location of a sample point (e.g., sample point 314) be represented by $[U_1, V_1]$. First, compute $U_1'=U_1$ mod 2 and $V_1'=V_1$ mod 2, or in other words, truncate $U_1$ and $V_1$ to one integer bit (e.g., a distance) and their fractional bits. Conceptually, the truncation performs a normalization operation that transforms the U-V coordinate of the sample point 314 into a smaller regional coordinate. For example, conceptually, the texel array 300 may be divided into grids, with horizontal gridlines stemming from every even V position (i.e., V positions whose least significant bit is 0) and vertical gridlines stemming from every even U position (i.e., U positions whose lease significant bit is 0). Each grid, therefore, is a square with 2-unit-distance sides. Within each grid, the upper-left corner's U-V coordinate would both have zeros as their least significant two bits, and each grid may have its own regional coordinate system. The truncated results $U_1'$ and $V_1'$ represent the sample point's transformed coordinates in a regional coordinate system of a 2-unit-distance grid. $U_1'$ and $V_1'$ may also represent the U-axis distance and V-axis distance relative to the 2-unit-distance grid.

Each 2-unit-distance grid contains four unit squares, each defined by a set of adjacent and orthogonal texels (e.g., the region 316 includes one such unit square). Conceptually, the next step is to determine, within the unit square containing the sample point, which of the two even texels (if the interpolated distance's MSB=0) or which of the two odd texels (if the interpolated distance's MSB=1) is closest to the sample point. In particular embodiments, if the interpolated distance's MSB=0, then the closest even texel may be determined as follows. First, if $U_1'<1$, then let distance $D_u=U_1'$; otherwise let distance $D_u=2-U_1'$. If $V_1'<1$, then let distance $D_v=V_1'$; otherwise let $D_v=2-V_1'$. A combined UV distance $D_1$ may then be computed by:

Distance $D_1$(for MSB=0)=$D_u+D_v$.

If this distance $D_1$ is equal to or less than 1, then the index of the even texel at the even U position (i.e., the U position whose least significant bit is 0) is selected, otherwise the index of the even texel at the odd U position is selected (i.e., the U position whose least significant bit is 1). The least significant bit of the V position and the least significant bit of the U position of the selected even texel would be the same. Using FIG. 3A as an example, if the MSB of the interpolated distance of a sample point is 0 and if the sample point is on the right side of diagonal 332 separating the even texels 318 and 324, $D_u$ would be $U_1'$ and $D_v$ would be $V_1'$. Since the sample point is on the right side of the diagonal, we know that $D_u+D_v$ would be greater than 1. As such, the index of the even texel at the odd U position would be selected, in which case texel 324 would be selected since its U coordinate is [01]. As can be seen from the figure, even texel 324 would be closer than even texel 318 to a sample point on the right side of diagonal 232.

On the other hand, if at step 430 it is determined that the MSB of the interpolated distance value D for sample point 314 is 1, sample point 314 would be deemed to be inside the region defined by the edge, and at step 350, two odd texels would be selected from the two-by-two-texel region 316. Thus, at step 350, if it is determined that the MSB of the interpolated distance value D for sample point 314 is 1, then odd texel pair 328 is selected. Once the texel pair is selected, the method 400 moves onto step 470 to determine which odd texel of the odd texel pair 328 is closer in distance to sample point 314. In particular embodiments, if the interpolated distance's MSB=1, then the closest odd texel may be determined as follows. First, if $U_1'<1$, then let distance $D_u=U_1'$; otherwise let distance $D_u=2-U_1'$. If $V_1'<1$, then let distance $D_v=1-V_1'$; otherwise let $D_v=V_1'-1$. A combined UV distance $D_2$ may then be computed by:

Distance $D_2$(for MSB=1)=$D_u+D_v$.

If this distance $D_2$ is equal to or less than 1, then the index of the odd texel at the even U position (i.e., the U position whose least significant bit is 0) is selected, otherwise the index of the odd texel at the odd U position is selected (i.e., the U position whose least significant bit is 1). The least significant bit of the V position and the least significant bit of the U position of the selected event texel would be the opposite in this case. Using FIG. 3A as an example, if the MSB of the interpolated distance of a sample point is 1 and if the sample point is on the right side of diagonal 330 separating the odd texels 322 and 320, $D_u$ would be $U_1'$ and $D_v$ would be $1-V_1'$. Based on this definition, we know that $D_u+D_v$ would be greater than 1. As such, the index of the odd texel at the odd U position would be selected, in which case texel 320 would be selected since its U coordinate is [01]. As can be seen from the figure, odd texel 320 would be closer than odd texel 322 to a sample point on the right side of diagonal 330.

Then, at step 480, the color index of the selected even or odd texel that is determined to be the closest in distance to sample point 314 is used to determine the color for sample point 314. As an example, if at step 450 it is determined that the even texel 318 is closest in distance to sample point 314 (which has MSB=0), then sample point 314 is determined to be coded blue (e.g., as determined based on the assumption discussed above that the index of texel 318 points to blue). Instead, if at step 450 it is determined that even texel 324 is closest in distance to sample point 314, then sample point 314 is determined to be coded green. On the other hand, if at step 470 it is determined that odd texel 320 is closest in distance to sample point 314 (which now has MSB=1), then sample point 314 is determined to be coded blue. Instead, if at step 470 it is determined that odd texel 322 is closest in distance to sample point 314, then sample point 314 is determined to be coded red. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for using the fine grain color index to determine the color of a sample position using single distance fields including the particular steps of the method of FIG. 4, this disclosure contemplates any suitable method for using the fine grain color index to determine the color of a sample position using single distance fields including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

As can be seen from the embodiments described above for encoding color indices in a texel array and deducing the appropriate color index to use based on interpolation results, a distance field label can be configured to support more than two colors. Thus, the letter "A" shown in the example above could define, for example, the foreground "A" to be black, a background in the internal cutout of the "A" to be red, and the rest of the background to be purple. Near the border region of the foreground of "A" and the internal cutout of "A," texels within that region may define the desired color scheme for "in" (e.g., black) and "out" (e.g., red). Similarly, texels near the border of the foreground of "A" and the rest of the background may have a different definition of the desired color scheme for "in" (e.g., black) and "out" (e.g., purple). This technique has the advantage of using distance fields (e.g., sharpness regardless of size and/or orientation) yet mitigating the traditional drawback of having limited color options. If the number of bits allocated to specifying the index increase (e.g., 3 bits instead of 2), then the number of color options would increase also increase (e.g., 3 bits allows for to 8 color options).

Single Distance Field Coarse Grain Color Selection

Figure 5A:
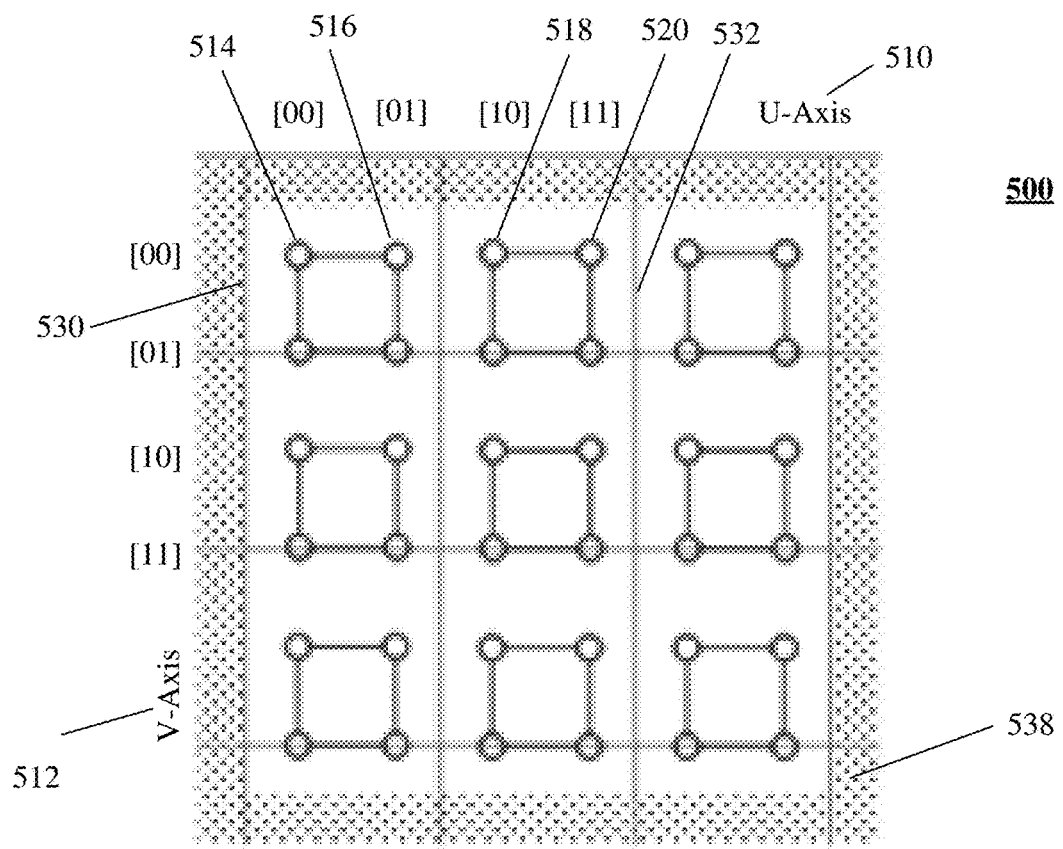
FIGS. 5A and 5B illustrate example diagrams of even-row and odd-row texel locations, respectively, on an array of texels for coarse grain color index selection.
Figure 5B:
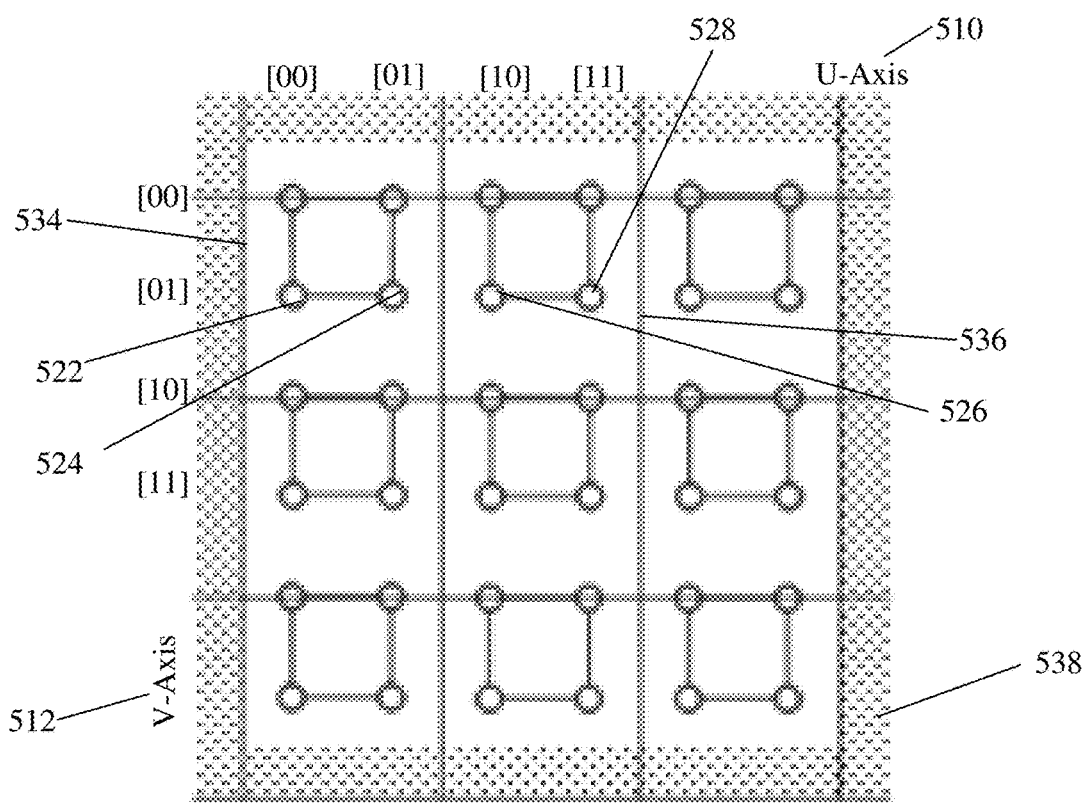
Figures 6A, 6B:
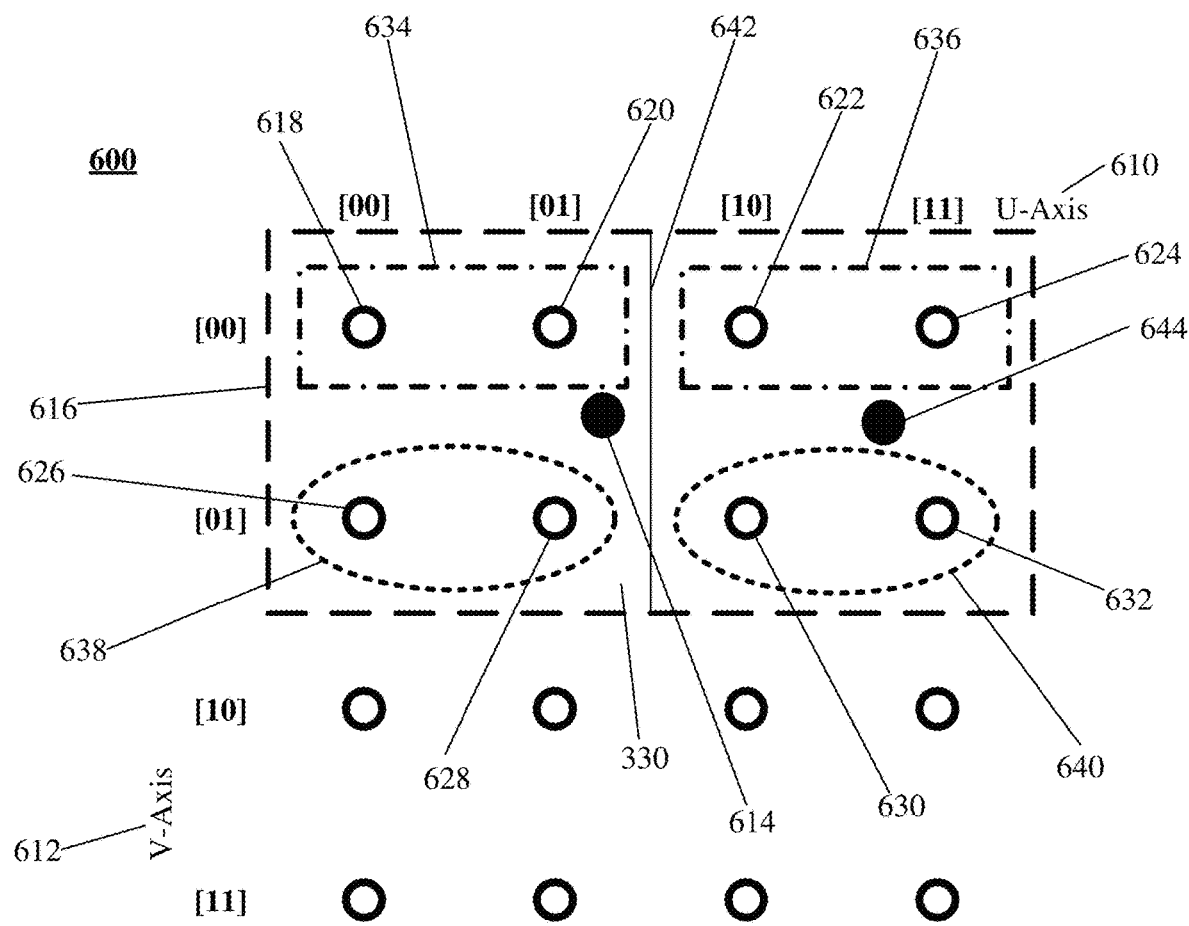
FIG. 6A illustrates using a coarse grain color index selection method on an array of texels.
FIG. 6B illustrates an example color look-up table for use with the coarse grain color index selection.
Figure 7:
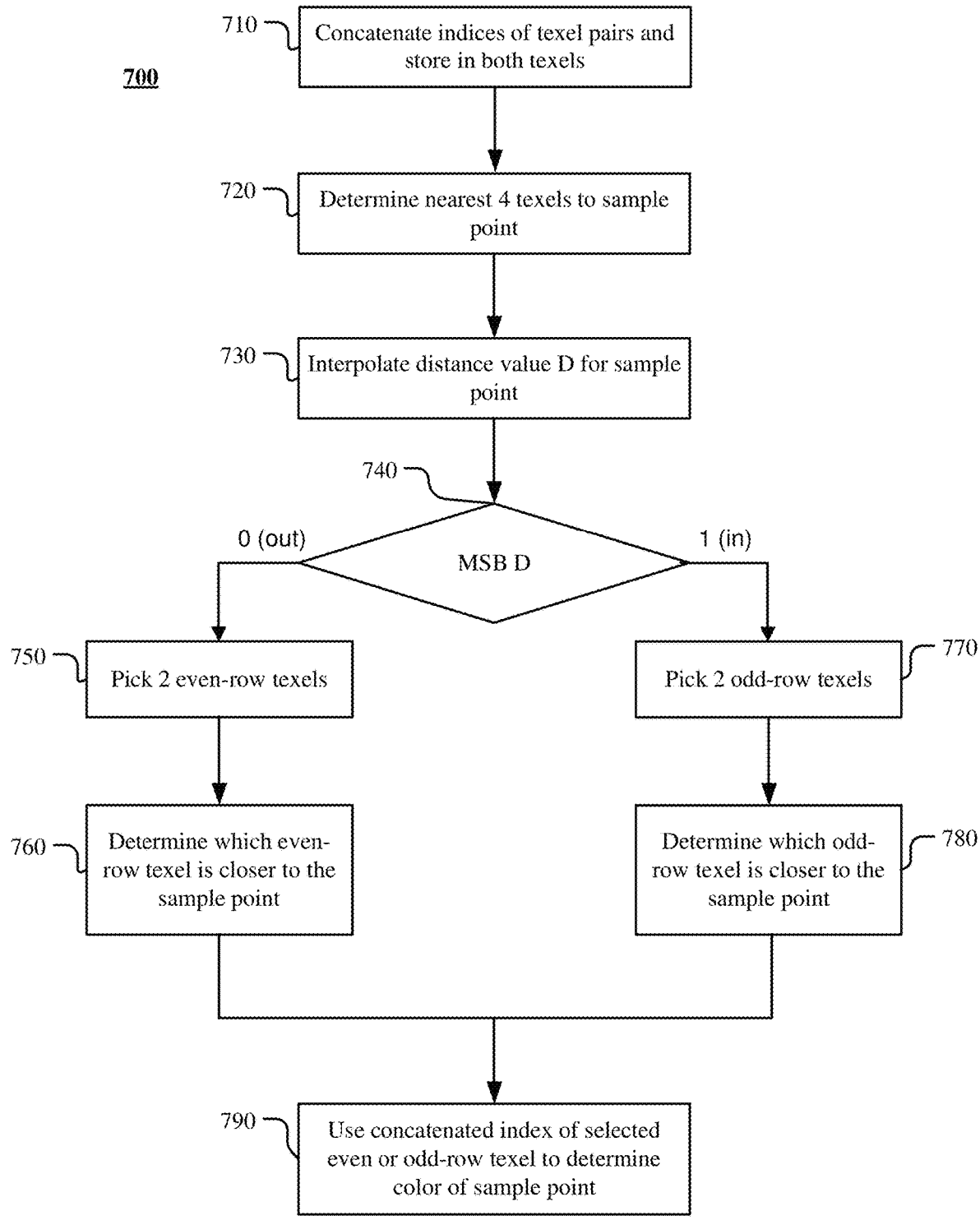
FIG. 7 illustrates an example method for using the coarse grain color index to determine the color of a sample position using single distance fields.

The discussion of the coarse grain color selection method using single distance fields will focus on the embodiment shown in FIGS. 5A, 5B, 6A, and 6B and the method described in FIG. 7. Briefly, FIGS. 5A and 5B illustrate example diagrams of even-row and odd-row texel locations, respectively, on an array of texels for coarse grain color index selection. FIG. 6A illustrates using a coarse grain color index selection method on an array of texels. FIG. 6B illustrates an example color look-up table for use with the coarse grain color index selection. In addition, FIG. 7 illustrates an example method 700 for using the coarse grain color index to determine the color of a sample position using single distance fields.

FIGS. 5A and 5B illustrate an example six-by-six array 500 of texels for coarse grain color selection in which the pairs of texels located at even-row or odd-row positions, respectively, are depicted within square-shaped regions. The coarse grain color selection method differs, in at least one aspect, from the fine grain color selection method in that the coarse grain color selection method uses a pair of texels, rather than a single texel, to specify the desired color index for a region surrounding the texel pair (e.g., by concatenating the indices of the pair of texels). As a result, the coverage area of each texel pair is larger than the coverage area of each texel used in the fine grain method. Any sample point that falls in a region covered by a texel pair would have the color specified by the combined color indices of that texel pair, provided that the texel pair is the ones assigned to the particular "in" or "out" status of the sample point (as determined based on its MSB, in particular embodiments). The benefit of using a pair of texels to encode the color index is that the number of bits available for encoding the index increases (e.g., from 2 bits to 4 bits), which means that more color options are available (e.g., from 4 to 16 colors). Since the first color table entry is typically set to transparent (i.e., no color), this leaves up to 15 unique colors that can be encoded by the 4-bit index used in the coarse grain color selection method.

As illustrated, the texels in the array 500 are arranged in a texture map at positions on a U-axis 510 and a V-axis 512 coordinate system. The circles represent texel positions on array 500. In embodiments where texel sampling is performed by hardware, the coordinates of a texel may be specified using binary values. For example, Rows 0-3 along the V-axis 512 are respectively referred to as Rows 00, 01, 10, and 11, and Columns 0-3 along the U-axis 510 are respectively referred to as Columns 00, 01, 10, and 11 (additional Rows and Columns could be similarly numbered using additional bits). Texel 514, for example, is located at u=00 and v=00 (or (00, 00)); texel 516 is located (00, 01), texel 518 is located at (01, 00), texel 520 is located at (01, 01) and so on. For simplicity, only the first four rows and the first four columns of the six-by-six array 500 are referenced here.

For the coarse grain color index selection, the texels in the array 500 are sorted into even-row or odd-row positions (i.e., "even-row" texels or "odd-row" texels) in order to determine which texel to use to look up the color associated with a sample position. In particular embodiments, the even and odd rows in the array 500 are determined based on the least significant bit of the V position of the associated row. As an example, texels 514, 516, 518, and 520 all have a V-position v=00 in which the least significant bit is 0. Thus, texels 514, 516, 518, and 520 are all even-row texels. On the other hand, texels 522, 524, 526, 528 all have a V-position v=01 in which the least significant bit is 1. Thus, texels 522, 524, 526, 528 are all odd-row texels.

As shown in FIGS. 5A and 5B, every aligned two-by-two texels includes two even-row texels (e.g., texels 514 and 516) and two odd-row texels (e.g., texels 522 and 524). In particular embodiments, the pairs of even-row texels (e.g., an even-texel pair 514 and 516, another even-texel pair 518 and 520) may be used to encode the color indices for the "out" case. To illustrate the coverage region for each pair of aligned even-row texels, FIG. 5A shows pairs of even-row texels located within their respective square-shaped regions (e.g., even-texel pair 514 and 516 are located within region 530, even-texel pair 518 and 520 are located within region 532, etc.). In addition, the pairs of odd-row texels (e.g., an odd-row texel pair 522 and 524, and anther odd-row texel pair 526 and 528) may be used to encode the color index for the "in" case and are illustrated in FIG. 5B as being located within the square-shaped regions 534 and 536, respectively. In addition, similar to FIGS. 3A and 3B discussed above, a shaded area 538 represents locations outside the texels of array 500 (e.g., texels that are more than 0.5 texel outside the array) and thus have distances of zero and indices of zero associated with a no color, or "transparent" result.

FIG. 6A illustrates an example four-by-four array 600 of texels. The sixteen texels in the array 600 are arranged on a texture map at positions specified in a coordinate system with a U-axis 610 and a V-axis 612. In particular hardware embodiments, the U position and V position may be specified in binary, as described with reference to FIG. 2A. The circles represent texel positions on array 600. A sample point 614 is selected (similar to how sample point 314 is selected above), and the color to be selected for sample point 614 is determined using the coarse grain color selection method 700 of FIG. 7. In particular embodiments, as discussed above, the pairs of texels in each even row (e.g., determined based on the least significant bit of the V position of the even texel being 0) may be used to encode the color index for the "out" case, and the pairs of texels in each odd row (e.g., determined based on the least significant bit of the V position of the odd texel being 1) may be used to encode the color index for the "in" case. To summarize, as used herein, "even-row texel" refers to a texel on an even row of the texel array (e.g., the least significant bit of the V position of an even-row texture is 0), and "odd-row texel" refers to a texel on an odd row of the texel array (e.g., the least significant bit of the V position of an odd-row texture is 1). The two indices of each texel pair are concatenated, and the result is associated with both texels during filtering (i.e., both texels of the texel pair would be associated with the same concatenated index).

As shown in FIG. 7, the method 700 may start at step 710, where the indices of adjacent, aligned pairs of even or odd texels are concatenated and stored with both associated texels in the texel buffer in the pixel block. This may be part of the data loading process when texel data is loaded into memory. As an example, as shown in FIG. 6A, for even-row texels located at V position v=00, the two indices of the pair of even-row texels 634 (including adjacent even-row texels 618 and 620) are concatenated and the result is associated with both texels. In addition, the pair of even-row texels 636 (including adjacent even-row texels 622 and 624) are concatenated and the result is associated with both texels. Likewise, for odd-row texels located at V position v=01, the two indices of the pair of odd-row texels 638 (including adjacent odd-row texels 626 and 628) are concatenated and the result is associated with both texels, and the two indices of the pair of odd-row texels 640 (including adjacent odd-row texels 630 and 632) are concatenated and the result is associated with both texels. In embodiments where each texel's color index is 2-bits, concatenating the color indices of two texels would result in a 4-bit color index. For example, if the color index of texel 618 is the 2-bit binary number 11 and the color index of texel 620 is the 2-bit binary number 00, concatenating the two may result in the 4-bit index 0011 (if the lower-ordered bits are filled by the index of the texel in the even U-position) or 1100 (if the lower-order bits are filled by the index of the texel in the odd U-position). Thereafter, the 4-bit index, such as 0011, would be associated with (e.g., stored with) both texels 618 and 620.

Then, at step 720, the four nearest texels to sample point 614 are determined and loaded into memory so that the distance values of those texels may be used to determine the interpolated distance of the sample point 614. FIG. 6A illustrates that the four nearest texels to the sample point 614 are even-row texels 620, 622 and odd-row texels 628, 630. In particular embodiments, even-row texels 620, 622 and odd-row texels 628, 630 are each associated with a distance field that includes a 6-bit distance and the 4-bit color index generated in step 710. As discussed above, the 4-bit color index stores a reference to an entry in a 16-color look-up table for determining the color associated with the texel. FIG. 6B illustrates an example color look-up table with 16 different entries. In particular examples shown, entry "0" corresponds to "transparent" (i.e., no color), entry "1" (or 0001 in binary) corresponds to the color red, entry "2" (or 0010 in binary) corresponds to the color green, and entry "3" (or 0011 in binary) corresponds to the color blue, and so on until entry "16" (or 1111 in binary). Thus, as an example, the even-row pair 634 including even-row texels 618 and 620 may each have a concatenated color index of "3" or "0011," indicating that the color associated with both texels is blue; the even-row pair 636 including even-row texels 622 and 624 may also have a concatenated color index of "3" or "0011," indicating that the color associated with both texels is also blue; the odd-row pair 638 including odd-row texels 626 and 628 may have a concatenated color index "1" or "0001," indicating that the color associated with both texels is red; and the odd-row pair 640 including odd-row texels 630 and 632 may have a concatenated color index of "2" or "0010," indicating that the color associated with both texels is green.

At step 730, the distance value D for sample point 614 is interpolated based on the distance values of the four nearest texels 620, 622, 628, 630. Then, at step 740, the highest order bit of the interpolated distance value D for sample point 614 is determined to be either 0 or 1. In order words, if the MSB of the interpolated distance value D for sample point 614 is determined to be 0, then sample point 614 is determined to be outside the region defined by the edge. On the other hand, if the MSB of the interpolated distance value D for sample point 614 is determined to be 1, then sample point 614 is determined to be inside the region defined by the edge. Thus, at step 740, if it is determined that the MSB of the interpolated distance value D for sample point 614 is 0, sample point 614 is determined to be outside the region defined by the edge, and at step 750, two even-row texels are selected from the closest 4 texels (as previously described, even-row texels are used to encode color indices in the "out" case and odd-row texels are used to encode color indices in the "in" case, in accordance with particular coarse grain index embodiments). As such, in this example, the two even-row texels selected would be even-row texels 620 and 622.

Once the even-row texels 620 and 622 are selected, the method 700 moves onto step 760 to determine which of the two even-row texels 620 and 622 is closer in distance to sample point 614. Particular embodiments of how this may be determined in hardware is as follows. As discussed above, in array 600 where distance is measured in texel units, the distance between two adjacent texel locations is one distance unit (e.g., the distance between even-row texels 620 and 622 is 1, and the distance between odd-row texels 628 and 630 is also 1). Since these four nearest texels 620,

622, 628, 6230 define a unit square, any point along a vertical line 642 between the even-row texels 620 and 622 and between the odd-row texels 628 and 630 corresponds to a position that is 0.5 texel from each of even-row texels 620 and 622 and odd-row texels 628 and 630 along the U-axis direction. As such, one way for hardware to determine which of the two even texels is closer to sample point 614 is by determining, conceptually, which side of the vertical line 642 the sample point 614 falls on (e.g., by determining whether the sample point 614 is less than or equal to 0.5 texels, or alternatively, greater than 0.5 texels, from the closest integer U-axis position, as discussed in detail below). As an example, for the even-row texels 620 and 622, any point on or to the left of vertical line 642 would have a distance from a closest integer U-axis position (e.g., u=01) that is less than or equal to 0.5 texels. If so, then the index of even-row texel 620 (i.e., the "left" even-row texel) would be deemed to be closer to the sample point 614, and therefore, selected. Conversely, any point to the right of vertical line 642 would have a distance from the closest integer U-axis position (e.g., u=01) than is greater than 0.5 texels. If so, then the index of even-row texel 422 (i.e., the "right" even-row texel) would be deemed to be closer to sample point 614, and therefore, selected.

Particular embodiments for selecting a coarse index is more formally defined as follows. Let the location of a sample point (e.g., sample point 614) be represented by $(U_2, V_2)$. First, compute $U_2'=U_2$ mod 1, or in other words, truncate $U_2$ to a fractional bit (i.e., the remainder). Conceptually, the truncation performs a normalization operation that calculates how much farther, in the U-axis direction, a sample point is from the closest integer U position. As an example, for a sample point that is interpolated to be at a decimal location corresponding to 1.3 texels along the U-axis, the truncation of the distance value would result in a remainder of 0.3. Similarly, for a sample point that is interpolated to be at a binary location corresponding to 2.7 texels along the U-axis, the truncation of the distance value would result in a remainder of 0.7.

From the closest 4 texels to the sample point 614, as discussed above, either the pair of even-row texels 620, 622 or the pair of odd-row texels 628, 630 are of interest based on the MSB of the interpolated distance value D for sample point 614. Conceptually, the next step is to determine which of the two even-row texels (if the interpolated distance's MSB=0) or which of the two odd-row texels (if the interpolated distance's MSB=1) is closest to the sample point. In particular embodiments, if the MSB of the interpolated distance is 0 (thereby indicating that the pair of even-row texels are of interest), then the closest one of the even-row texels may be determined as follows. As previous discussed, first compute $U_2'=U_2$ mod 1, where $U_2$ is the U-position of the sample point in texture space. Then, if $U_2'>0.5$, the index of the even texel at the even U position (i.e., the U position whose least significant bit is 0) is selected. Otherwise, if $U_2' \le 0.5$, the index of the even texel at the odd U position is selected (i.e., the U position whose least significant bit is 1). Using FIG. 6A as an example, if the MSB of the interpolated distance of a sample point is 0 and if $U_2'=U_2$ mod $1 \le 0.5$, then the sample point would fall on the left side of vertical line 642. As such, the index of the even-row texel at the odd U-position would be selected, in which case even-row texel 620 would be selected since its U coordinate is [01]. As can be seen from the figure, even-row texel 620 would be closer than even-row texel 622 to the sample point 614.

On the other hand, if at step 740 it is determined that the MSB of the interpolated distance value D for sample point 614 is 1, sample point 614 is determined to be inside the region defined by the edge, and at step 770, the two odd-row texels are selected from the closest 4 texels. As such, the two odd-row texels selected would be odd-row texels 628 and 630. Once the odd-row texels 628 and 630 are selected, the method 700 moves onto step 780 to determine which of the odd-row texels 628 and 630 is closer in distance to sample point 614. The closest odd-row texel may be determined similar to how the closest even-row texel is determined, as discussed above. Specifically, if the texture location of a sample point (e.g., sample point 614) is $(U_2, V_2)$, first compute $U_2'=U_2$ mod 1, or in other words, truncate $U_2$ to a fractional bit (i.e., the remainder). Then, if $U_2'>0.5$, the index of the odd-row texel at the even U position (i.e., the U position whose least significant bit is 0) is selected. Otherwise, if $U_2' \le 0.5$, the index of the odd-row texel at the odd U position is selected (i.e., the U position whose least significant bit is 1). Using FIG. 6A as an example, if the MSB of the interpolated distance of a sample point is 1 (indicating that the odd-row texels are of interest) and if $U_2'=U_2$ mod $1 \le 0.5$, then the sample point would fall on the left side of vertical line 642. As such, the index of the odd-row texel at the odd U position would be selected, in which case odd-row texel 628 would be selected since its U coordinate is [01]. As can be seen from the figure, odd-row texel 628 would be closer than odd-row texel 630 to the sample point 614.

The example discussed above describes the situation in which the sample point 614 is located at a position between two sets of aligned texels (e.g., between the texel pair 634 and texel pair 636), which also means that the four neighboring texels (e.g., 620, 622, 628, and 630) may have unique 4-bit concatenated indices. In other words, as shown in FIG. 6A, sample point 614 is located between the pair of even-row texels 618, 620 and the pair of even-row texels 622, 624, and similarly between the pair of odd-row texels 626, 628 and the pair of odd-row texels 630, 632. However, a sample point may instead be located within an aligned set of 2×2 texels (e.g., within texels 618, 620, 626, 628), which means that the even-row texels would have identical 4-bit concatenated indices and the odd-row texels would have identical 4-bit concatenated indices. As an example, as shown in FIG. 6A, sample point 644 located at $(U_3, V_3)$ is located between the texels of the pair of even-row texels 622, 624, and similarly between the texels of the pair of odd-row texels 630, 632. In this situation, the 4 closest texels to sample point 644 would include the pair of even-row texels 622, 624 and the pair of odd-row texels 630, 632. Using the method 700 described above, after determining whether to choose the even-row texel pair (if the interpolated distance's MSB=0) or the odd-row texel pair (if the interpolated distance's MSB=1), selecting the closest even-row or odd-row texel by computing whether $U_3'=U_3$ mod $1 > 0.5$ or $\le 0.5$ leads to a result that is contrary to the conceptual idea of selecting the closest texel. As an example, if the even-row texel pair 622, 624 is selected (based on the interpolated distance's MSB=0), and it is determined that $U_3'=U_3$ mod $1 > 0.5$, then the index of the even-row texel at the even U position (i.e., the U position whose least significant bit is 0) is selected. However, this would lead to the selection of the "left-side" even-row texel 622 (since its U position is 10), even though conceptually the determination that $U_3'>0.5$ indicates that the "right-side" even-row texel 624 is closer. Despite this seemingly incongruous result, because even-row texels 622 and 624 have the same concatenated indices, the end result of which even-row texel's index is selected is inconsequential. In a similar manner, the same result would occur when selecting between the pair of odd-row texels 630, 632.

Going back to FIG. 7, after determining which even-row texel or odd-row texel is closer to the sample point 614, at step 790, the concatenated color index of the selected even-row or odd-row texel that is determined to be the closest in distance to sample point 614 is used to determine the color for sample point 614. As an example, if at step 760 it is determined that even-row texel 620 is closest in distance to sample point 614 (which has MSB=0), then sample point 614 is determined to be coded blue (e.g., as determined based on the assumption discussed above that the index of even-row texels 618 and 620 code to blue). If, instead, at step 760 it is determined that even-row texel 622 is closest in distance to sample point 614 (which has MSB=0), the sample point 614 is also determined to be coded blue. On the other hand, if at step 780 it is determined that odd-row texel 628 is closest in distance to sample point 614 (which has MSB=1), the sample point 614 is determined to be coded red. Instead, if at step 780 it is determined that odd-row texel 630 is closest in distance to sample point 614 (which has MSB=1), the sample point 614 is determined to be coded as coded green. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for using the coarse grain color index to determine the color of a sample position using single distance fields including the particular steps of the method of FIG. 7, this disclosure contemplates any suitable method for using the coarse grain color index to determine the color of a sample position using single distance fields including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

As can be seen from the embodiments described above for encoding concatenated color indices in a texel array and deducing the appropriate concatenated color index to use based on interpolation results, a distance field label with concatenated color indices of adjacent texels can be configured to support up to 16 colors (e.g., a "transparent" color and up to 15 unique colors). Similar to the fine grain technique, this coarse grain technique also has the advantage of using distance fields (e.g., sharpness regardless of size and/or orientation) yet mitigating the traditional drawback of having limited color options.

Using Dual Distance Field to Determine Color of a Sample Position

In particular embodiments, using single distance fields based on the distance to only one edge may result in the sharp corners (e.g., a diamond shape) of characters or glyphs to appear rounded or smoothed-out when they are rendered, especially as the resolution of the distance field decreases. A solution to this is to use dual distance fields to capture information at the intersection between two edges. In particular embodiments, when a label (e.g., character, glyph, etc.) is created, an authoring software that created the label may identify and label edges, such as type0 and type1 edges. Dual distance fields capture a texel's distances to two different types of edges to preserve intersection data. Each texel in a dual distance field label has two distance values: distance0 denotes the distance from the texel to the closest type0 edge and distance1 denotes the distance from the texel to the closest type1 edge.

Figure 8:
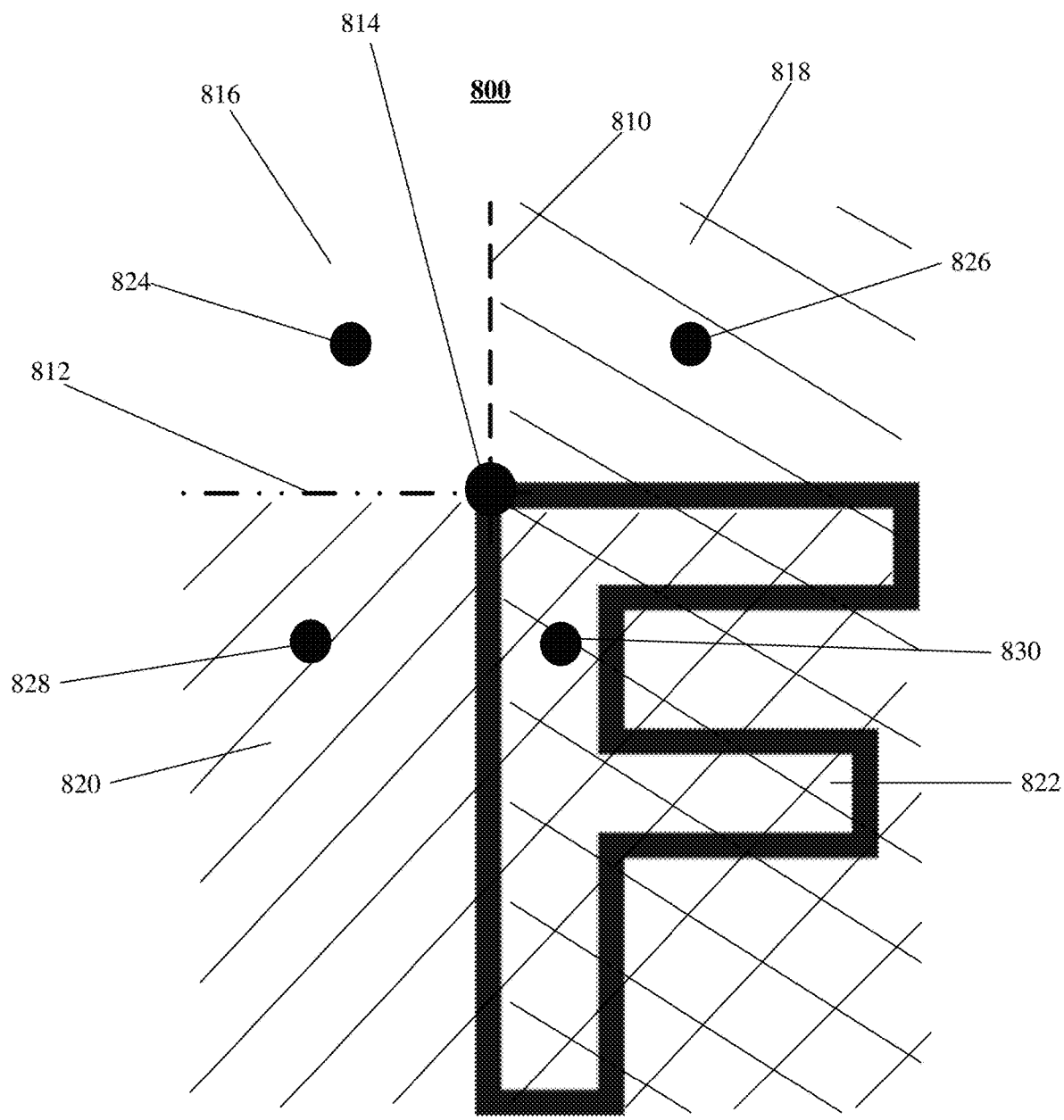
FIG. 8 illustrates an example region where two different edge-type edges meet at a vertex and result in four different regions associated with four different combinations of being inside or outside of each of the edges.

As previously discussed, each distance value of a texel encodes whether the texel is "in" or "out" relative to the edge from which the distance is measured. For a dual distance field texel, each of its distance value could be either "in" or "out," which means that there are four "in" and "out" combinations for each texel. FIG. 8 illustrates an example region associated with a letter "F" 800 where two different edge-type edges meet at a vertex, resulting in four different regions associated with four different combinations of being inside or outside of each of the edges. As shown in FIG. 8, A type0 edge 810 and a type1 edge 812 intersect at point 614. Although the edges 810, 812 are drawn as solid lines, the entire length of each edge 810, 812 is not necessarily all visible in the label. For example, what is shown in FIG. 8 may correspond to the upper-left corner of the letter "F," with point 814 being that corner, the right half of edge 812 defining the horizonal edge of the corner, and the lower half of edge 810 defining the vertical edge of the corner. The rest of edges 810 and 812 may be conceptual extensions of the actual, visible portions of those edges 810, 812, created for purposes of defining the distance values for nearby texels. If what is shown is the upper-left corner of "F," texels that are below edge 812 may be deemed "in" relative to edge 812 and texels that are above edge 812 may be deemed "out" relative to edge 812. Similarly, texels that are to the right of edge 810 may be deemed "in" relative to edge 810 and texels that are to the left of edge 810 may be deemed "out" relative to edge 810. Because type0 edge 810 intersects with type1 edge 812 at point 814, four different regions 816, 818, 820, and 822 are formed. The texels in each region would have a different "in" and "out" combination relative to the two edges 810, 812. For example, texels in region 816 would have an out/out combination relative to edges 810/812, respectively; texels in region 818 would have an in/out combination; texels in region 826 would have an out/in combination, and texels in region 830 would have an in/in combination. Like traditional single distance field labels, traditional dual distance field labels only support two colors—foreground and background. Foreground and background would each be encoded by particular combination(s) of "in" and "out." For example, regions that are in/in would be considered to be foreground, and everything else (i.e., out/out, in/out, or out/in) would be considered to be background. Using FIG. 8 as an example, for the acute angle of the letter "F" at point 814, in/in would designate foreground and the rest would bet set to background. But for one of the obtuse angles in the letter "F" (e.g., any of the interior angles formed by the letter's vertical bar and either of the two horizontal bars), out/out would need to designate background and the rest would be set to foreground to properly color the interior of "F." Existing methods may attempt to solve this problem using three types of edges. In contrast, the embodiments described herein solve this problem with just two types of edges (e.g., type0 and type1).

Particular embodiments described herein expand the color options of dual distance field fonts to beyond two and further allow each "in" and "out" combination to be assigned different colors. Using FIG. 8 as an example, region 816 is white colored, region 818 is red colored, region 820 is yellow colored, and region 822 is orange colored.

When a dual distance label is mapped to screen space, interpolation is used to determine the color for screen pixels based on the dual distance fields of the label's texels. As mentioned above, each texel may have a distance0 and a distance1 value specifying, respectively, the texel's distance to the closest edge0 and the closest edge1. In particular hardware implementations, each distance value may be represented by a binary value (e.g., 110111). In particular embodiments, the most significant bit (MSB) of each distance value may be used to denote whether the texel is "in" or "out" relative to the associated edge type, and the rest of the bits may indicate distance. For example, if distance0 is 110111, the MSB of distance0, which may be denoted by MSB(distance0), would be 0 (which denotes "out") and the texel's distance from the closest edge0 would be 10111. Similarly, if distance1 is 000001, the MSB(distance1)=1 and the texel's distance from the closest edge1 would be 00001.

When distance values of texels are used in interpolation computations (e.g., bilinear interpolation) for a pixel's sample point in texture space, the sample point will be assigned an interpolated distance0, computed based on the distance0 values of the four neighboring texels. In addition, the sample point will be assigned an interpolated distance1, computed based on the distance1 values of the four neighboring texels. Based on the MSB of the interpolated distance0, it can be determined whether the sample point is "in" (if MSB=1) or "out" (if MSB=0) relative to edge type0. Similarly, based on the MSB of the interpolated distance1, it can be determined whether the sample point is "in" (if MSB=1) or "out" (if MSB=0) relative to edge type1. As an example, as shown in FIG. 8, sample point 824 would be associated with the combination of "out/out" because it would have a MSB (interpolated distance0)=0 (out) and a MSB (interpolated distance1)=0 (out), meaning that sample point 824 is outside both the type0 edge 810 and the type1 edge 812. Sample point 826 would be associated with the combination of "in/out" because it would have a MSB (interpolated distance0)=1 (in) and a MSB (interpolated distance1)=0 (out), meaning that sample point 826 is inside the type0 edge 810 but outside the type1 edge 812. Sample point 828 would be associated with the combination of "out/in" because it would have a MSB (interpolated distance0)=0 (out) and a MSB (interpolated distance1)=1 (in), meaning that sample point 828 is outside the type0 edge 810 but inside the type1 edge 812. In addition, sample point 830 would be associated with the combination of "in/in" because it would have a MSB (interpolated distance0)=1 (in) and a MSB (interpolated distance0)=1 (in), meaning that sample point 830 is inside both the type0 edge 810 and the type1 edge 812. In addition, similar to the single-edge distance labels discussed above, texels determined to be outside of the label's texel array are treated as being zero. As a result, any sample position more than 0.5 texel outside the label interpolates a distance with MSB=0, resulting in a "transparent" color to be chosen for the sample position.

In particular embodiments, once it has been determined which of the four combinations of "in" and "out" is associated with the sample point, a color index can be accessed to determine the desired color for that sample point. As will be described in further detail below, the texels within a region of the label may specify the desired color index for each "in/out" combination. In particular embodiments, each distance value (e.g., 6 bits) may be associated with a color index (e.g., 2 bits).

In particular embodiments, dual distance field labels may encode the desired color (or foreground/background determination) for the four combinations of "in" and "out" using a fine grain technique or a coarse grain technique. In a fine grain embodiment, described in further detail below, based on the MSB of the interpolated distance of the sample point and the sample point's position in texture space, a color index may be selected from the nearby texels and used to determine the desired color for the sample point. The index value may be used to select a color from a color look-up table. For example, a two-bit color index may correspond to the color orange in a look-up table. Alternatively, the index value may be used to select a Boolean function (e.g., AND, OR, etc.) to be applied to the MSB (interpolated distance0) and the MSB (interpolated distance1) to determine whether the sample point should be associated with a foreground or background. For example, if the index selects an AND operation, applying such an operation to the MSBs of 1 and 0 would result in 0, which may indicate that the sample point should be the background. On the other hand, if the index selects an OR operation, applying the operation to the MSBs of 1 and 0 would result in 1, which may indicate that the sample point should be the foreground. In other words, the index of a texel may define, for the region in which the texel is located, how each "in"/"out" combination should be mapped to background or foreground.

In a coarse grain embodiment, as discussed in further detail below, the indices selected from a pair of texels may be concatenated to form a larger index value (e.g., two 2-bit indices could be concatenated to form a 4-bit index). An index that is 4-bit in size would be able to point to 16 different colors in a color look-up table (e.g., with one transparent and 15 colors).

Dual Distance Field Fine Grain Color Selection

Figures 9A, 9B:
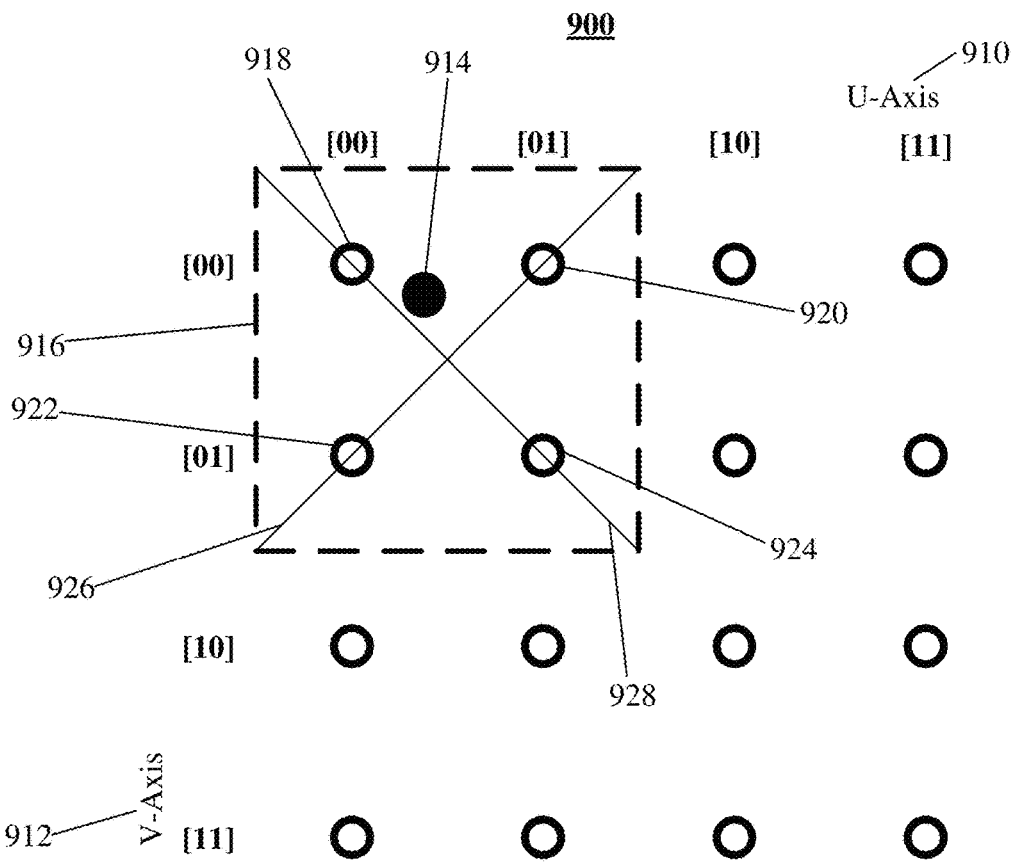
FIG. 9A illustrates using a fine grain color index selection method on an array of texels associated dual distance fields.
FIG. 9B illustrates example distance field labels associated with aligned two-by-two sets of texels used for the fine grain color index selection.
Figure 10:
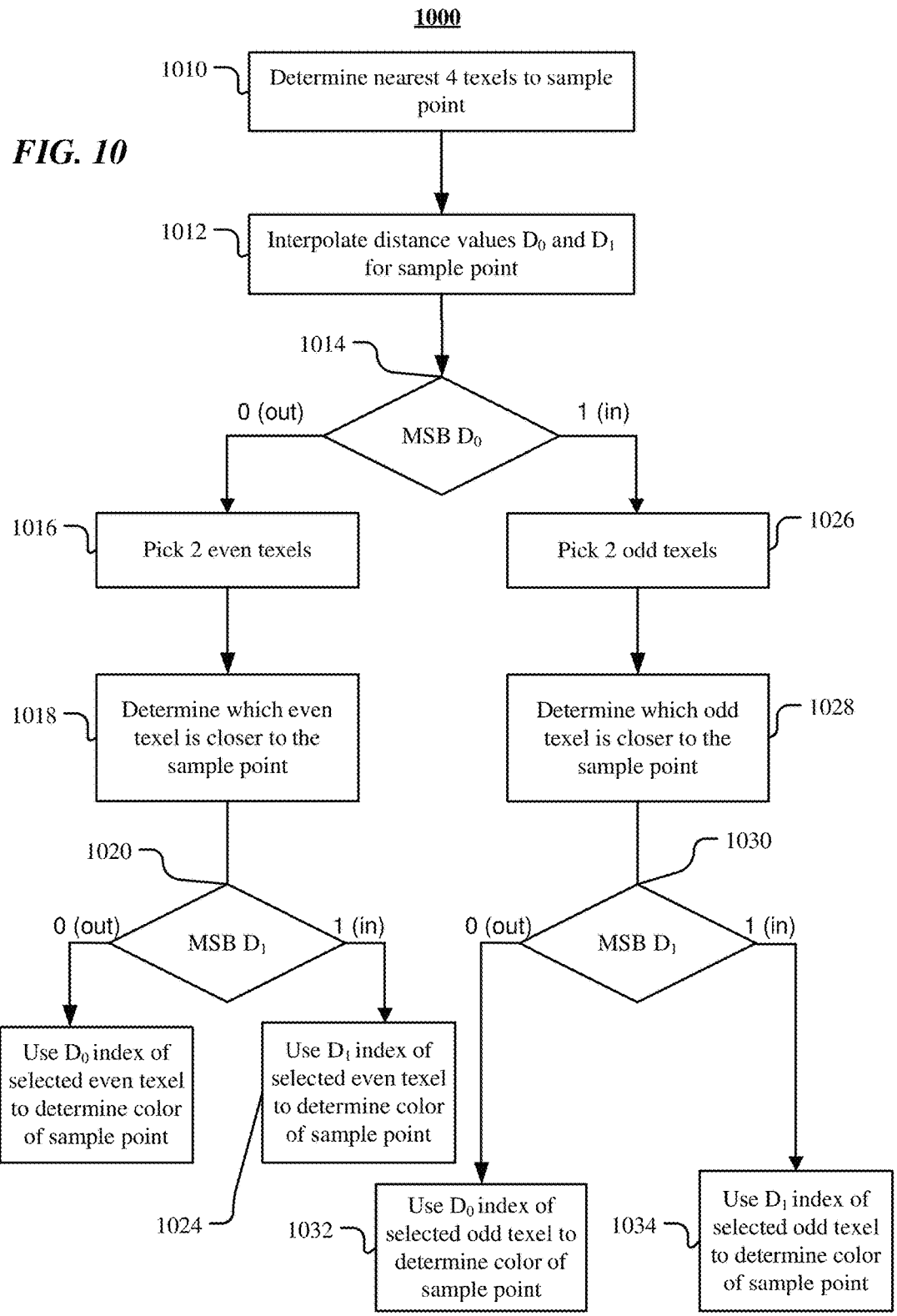
FIG. 10 illustrates an example method for using the fine grain color index to determine the color of a sample position using dual distance fields.

The discussion of the fine grain, dual distance field color selection method for a sample point will focus on the embodiment shown in FIGS. 9A and 9B and the method described in FIG. 10. Briefly, FIG. 9A illustrates using a fine grain color index selection method on an array of texels having dual distance fields. FIG. 9B illustrates example distance fields associated with aligned two-by-two sets of texels used for the fine grain color index selection. In addition, FIG. 10 illustrates an example method 1000 for using the fine grain color index encoded within dual distance field texels to determine the color of a sample point.

FIG. 9A illustrates an example four-by-four array 900 of texels. The sixteen texels in the array 900 are arranged on a texture map at positions on a U-axis 910 and V-axis 912. In particular hardware embodiments, U and V coordinates are specified in binary numbers, starting with 00 (corresponding to decimal value 0) and ending with 11 (corresponding to decimal value 3). The circles represent texel position in the texel array 900. A sample point 914 is selected using the process described above (e.g., projecting a ray from a pixel to a surface in 3D view space, finding the point of intersection, and mapping the point of intersection into 2D texture space). As such, the sample point 914 corresponds to a pixel in a screen, and the color to be selected for sample point 914 is determined using the fine grain color selection method 1000. As shown in FIG. 10, the method 1000 may start at step 1010, where the four nearest texels to sample point 914 are determined. FIG. 9A illustrates that the four nearest texels to sample point 914 are the texels in the two-by-two texel region 916, and includes texel 918, texel 920, texel 922, and texel 924.

As shown in FIG. 9B, texels 918, 920, 922, and 924 are each associated with dual distance fields. In particular embodiments, each distance field may be 8-bits long. The first distance field of a texel may include a first 6-bit distance value, represented by distance0 or $D_0$, and a 2-bit color index. The MSB bit of distance0 may encode whether the texel is "in" or "out" and the rest of the bits may specify the distance between the texel and the closest type0 edge. The second distance field of the same texel may include a second 6-bit distance value, represented by distance1 or $D_1$, and a 2-bit color index. The MSB bit of distance1 may encode whether the texel is "in" or "out" and the rest of the bits may specify the distance between the texel and the closest type1 edge. Each color index of each of the texels 918, 920, 922, and 924 references an entry in a 4-entry color look-up table (e.g., the color look-up table shown in FIG. 3B).

In particular embodiments, in each region of the texel array 900, the desired colors for the four "in"/"out" combinations may be specified, respectively, by the four color indices of adjacent pairs of texels. For example, the distance0 and distance1 indices of texel 918 and the distance0 and distance1 indices of texel 920 may indicate the desired color for the region, depending on which "in"/"out" combination is associated with the sample point 914 (to be described in further detail below). Thus, each index may represent the desired color index for a particular "in"/"out" combination. In particular embodiments, what "in"/"out" combination represented by each index may be assigned in accordance with a predetermined pattern. For example, FIG. 9B illustrates an example of the pattern for a 2×2 set of aligned texels, such as texels 918, 920, 922, and 924. As shown, texel 918's distance0 index specifies the desired color for the out/out case and the distance1 index specifies the desired color for the out/in case; texel 920's distance0 index specifies the desired color for the in/out case and the distance1 index specifies the desired color for the in/in case; texel 922's distance0 index specifies the desired color for the in/out case and the distance1 index specifies the desired color for the in/in case; and texel 924's distance0 index specifies the desired color for the out/out case and the distance1 index specifies the desired color for the out/in case. This pattern may be repeated throughout the texel array 900. For example, this pattern for the aligned 2×2 texels may be repeated by the 2×2 texels located at (U,V) coordinates (10, 00), (11, 00), (10, 01), and (11, 01), the 2×2 texels located at (00, 10), (01, 10), (00, 11), (01, 11), and the 2×2 texels located at (10, 10), (11, 10), (10, 11), and (11, 11).

The pattern shown in FIG. 9B may be described in a variety of ways, such as in terms of even texels and odd texels. Each texel may be referred to as an even texel or odd texel, defined in the same manner as described above with reference to FIGS. 3A-3B. For example, texel 918 may be considered as an even texel because the LSBs of its U and V coordinates are the same (i.e., both 0 in this case). Texel 924 may also be considered as an even texel because the LSBs of its U and V coordinates are also the same (i.e., both 1 in this case). In contrast, texel 920 may be considered as an odd texel because the LSBs of its U and V coordinates are different (i.e., 1 and 0 in this case). Similarly, texel 922 may be considered as an odd texel because the LSBs of its U and V coordinates are also different (i.e., 0 and 1 in this case). The pattern shown in FIG. 9B may be described as follows: each even texel may have its distance0 index associated with the out/out combination and distance1 index associated with the out/in combination, and each odd texel may have its distance0 index associated with the in/out combination and distance1 index associated with the in/in combination. The pattern is repeated in an interleaved fashion. Within an aligned 2×2 set of texels, each distance0 index is associated with either the out/out or in/out combination, and each distance1 index is associated with either the out/in or in/in combination. It should be noted that although the in/out combination that is associated with each index may repeat, it does not mean that the index value itself needs to follow any particular pattern. For example, even though the texel 918 and the texel located at (10, 00) may both have a distance0 index that is associated with the out/out combination, the distance0 index of texel 918 may correspond to the color red while the distance0 index of the texel at (10, 00) may correspond to the color blue.

Similar to the fine grain single distance field embodiment described above with reference to FIGS. 2A and 2B, the even and odd texels in the fine grain dual distance field embodiment also specify, via their respective indices, the desired color for their respective coverage areas. For example, the even texels specify the colors for their respective coverage areas (e.g., as shown in FIG. 2A) and the odd texels specify the colors for their respective coverage areas (e.g., as shown in FIG. 2B). As will be described in more detail below, if the MSB of the interpolated distance0 for sample point 914 is 0, the closest even texel may be selected. The selected even texel has two indices associated with distance0 and distance1. If the MSB of the interpolated distance1 for sample point 914 is 0, the index associated with distance0 will be selected. On the other hand, if the MSB of the interpolated distance1 is 1, the index associated with distance1 will be selected. The selected index can then be used to determine the color for the sample point 914, which is located within the coverage area of the selected even texel. As another example, if the MSB of the interpolated distance0 for sample point 914 is 1, the closest odd texel may be selected. The selected odd texel has two indices associated with distance0 and distance1. If the MSB of the interpolated distance1 for sample point 914 is 0, the index associated with distance0 will be selected. On the other hand, if the MSB of the interpolated distance1 is 1, the index associated with distance1 will be selected. The selected index can then be used to determine the color for the sample point 914, which is located within the coverage area of the selected odd texel.

The final index that has been selected may then be used to determine the color of the sample point 914. As described above, particular embodiments of the index may specify a particular logic operation (e.g., AND, OR, XOR, NAND, NOR, XNOR, etc.) to be applied to the MSBs of the interpolated distance0 and distance1 values of the sample point 914. The result of the logic operation may indicate whether the sample point 914 is a background (e.g., if the logic operation results in 0) or a foreground (e.g., if the logic operation results in 1). In other embodiments, the selected index may point to a particular entry in a color look-up table (e.g., FIG. 3B).

As shown in FIG. 10, at step 1012, the distance values distance0 ($D_0$) and distance1 (D1) for sample point 914 are interpolated based on the distance values of each of texels 918, 920, 922, and 924. In particular embodiments, interpolated distance $D_0$ specifies the distance between the sample point 914 and the closest type0 edge, and interpolated distance $D_1$ specifies the distance between the sample point 914 and the closest type1 edge. Then, at step 1014, the highest order bit of the interpolated distance value $D_0$ for sample point 914 is determined to be either 0 or 1. In order words, if the MSB of the interpolated distance value $D_0$ for sample point 914 is determined to be 0, then sample point 914 is determined to be "out" relative to the closest type0 edge (i.e., outside the region defined by the closest type0 edge). On the other hand, if the MSB of the interpolated distance value $D_0$ for sample point 914 determined to be 1, then sample point 914 is determined to be "in" relative to the closest type0 edge (i.e., inside the region defined by the closest type0 edge). Similarly, if the interpolated $D_1$=0, then sample point 914 is determined to be "out" relative to the closest type1 edge; if the interpolated $D_1$=1, then sample point 914 is determined to be "in" relative to the closest type1 edge.

If it is determined at step 1014 that the MSB of the interpolated distance value $D_0$ for sample point 914 is 0, then at step 1016, the sample point 914 is determined to be "out" relative to the closest type0 edge, and thus two even texels are selected from the two-by-two texel region 916. The even texels are defined in the same manner as described above with reference to FIGS. 3A-3B. Specifically, within the two-by-two texel region 916, texel 918 may be considered as an even texel because the LSBs of its U coordinate (u=00) and V coordinate (v=00) are the same (i.e., both 0 in this case), and texel 924 may also be considered as an even texel because the LSBs of its U coordinate (u=01) and V coordinate (v=01) are also the same (i.e., both 1 in this case). Thus, texels 918 and 924 are selected as the two even texels within the two-by-two texel region 916.

Then, at step 1018, the method 1000 determines which even texel of the selected two even texels is closer in distance to the sample point 914. This is determined similar to the single distance, fine grain embodiment described in FIG. 3A and step 450 of the method 400 of FIG. 4. Specifically, one way for hardware to determine which of the two even texels is closer to the sample point 914 is by determining, conceptually, which side of a diagonal 926 the sample point 914 falls in. This is done by summing the U-axis and V-axis distances of the interpolated distance value $D_0$ of the sample point 914. Thus, for the two-by-two texel region 916, any point on or to the left of diagonal 926 would have its U-axis and V-axis distances sum up to 1 distance unit or less (in this example, a point falling on the diagonal is being counted as being on closer to the left texel). If so, then the indices of even texel 918 (e.g., including the distance0 index and the distance1 index) would be deemed to be closer to the sample point 914 and, therefore, selected. Conversely, any point to the right of diagonal 926 would have its U-axis and V-axis distances sum up to greater than 1 distance unit. If so, then the indices of texel 924 (e.g., including the distance0 index and the distance1 index) would be deemed to be closer to the sample point 914 and, therefore, selected. As an example, if the sample point 914 is determined to be to the left of diagonal 926, then the indices of even texel 918 (e.g., including the distance0 index and the distance1 index) would be selected.

Since two indices, the distance0 index and the distance1 index, are associated with the even texel 918, the method 1000 next determines which index of even texel 918 to use. To make this determination, at step 1020, the method 1000 determines whether the highest order bit of the interpolated distance value $D_1$ for sample point 914 is either 0 or 1. As such, if it is determined at step 1020 that the MSB of the interpolated distance value $D_1$ for sample point 914 is 0, the sample point 914 is determined to be "out" relative to the closest type1 edge, and at step 1022, the index associated with distance0 of the selected even texel will be selected to determine the color of sample point 914. On the other hand, if it is determined at step 1020 that the MSB of the interpolated distance value $D_1$ for sample point 914 is 1, the sample point 914 is determined to be "in" relative to the closest type1 edge, and at step 1024, the index associated with distance1 of the selected even texel will be selected to determine the color of sample point 914. As discussed above, in particular embodiments, the final index selected may then be used to determine the color of the sample point 914 based on the particular logic operation specified by the index to indicate whether the sample point 914 is a background (e.g., if the logic operation results in 0) or a foreground (e.g., if the logic operation results in 1). In other embodiments, the selected index may point to a particular entry in a color look-up table similar to that described above in relation to FIG. 3B. As an example, if the sample point 914 is determined to be closer in distance to the even texel 918, and the MSB of the interpolated distance value $D_1$ for sample point 914 is determined to be 0, then the index associated with distance0 of the even texel 918 will be selected to determine the color of sample point 914. Referencing FIG. 3B, if the 2-bit index of distance0 encodes for "3," then sample point 914 is determined to be coded blue.

On the other hand, if it is determined at step 1014 that the MSB of the interpolated distance value $D_0$ for sample point 914 is 1, then at step 1026, the sample point 914 is determined to be "in" relative to the closest type0 edge, and thus two odd texels are selected from the two-by-two texel region 916. The odd texels are defined in the same manner as described above with reference to FIGS. 3A-3B. Specifically, within the two-by-two texel region 916, texel 920 may be considered as an odd texel because the LSBs of its U coordinate (u=01) and V coordinate (v=00) are different (i.e., 1 and 0 in this case), and texel 922 may also be considered as an odd texel because the LSBs of its U coordinate (u=00) and V coordinate (v=01) are also different (i.e., 0 and 1 in this case). Thus, texels 920 and 922 are selected as the two odd texels within the two-by-two texel region 916.

Then, at step 1028, the method 1000 determines which odd texel of the selected two odd texels is closer in distance to the sample point 914. This is determined similar to the embodiment described in FIG. 3A and step 470 of the method 400 of FIG. 4. Specifically, one way for hardware to determine which of the two odd texels is closer to the sample point 914 is by determining, conceptually, which side of a diagonal 928 the sample point 914 falls in. This is done by summing the U-axis and V-axis distances of the interpolated distance value $D_0$ of the sample point 914. Thus, for the two-by-two texel region 916, any point on or to the left of diagonal 928 would have its U-axis and V-axis distances sum up to 1 distance unit or less (in this example, a point falling on the diagonal is being counted as being on closer to the left texel). If so, then the indices of odd texel 922 (e.g., including the distance0 index and the distance1 index) would be deemed to be closer to the sample point 914 and, therefore, selected. Conversely, any point to the right of diagonal 928 would have its U-axis and V-axis distances sum up to greater than 1 distance unit. If so, then the indices of texel 920 (e.g., including the distance0 index and the distance1 index) would be deemed to be closer to the sample point 914 and, therefore, selected. As an example, if the sample point 914 is determined to be to the left of diagonal 928, then the indices of odd texel 922 (e.g., including the distance0 index and the distance1 index) would be selected.

Since two indices, the distance0 index and the distance1 index, are associated with the odd texel 922, the method 1000 next determines which index of odd texel 922 to use. To make this determination, at step 1030, the method 1000 determines whether the highest order bit of the interpolated distance value $D_1$ for sample point 914 is either 0 or 1. As such, if it is determined at step 1030 that the MSB of the interpolated distance value $D_1$ for sample point 914 is 0, the sample point 914 is determined to be "out" relative to the closest type1 edge, and at step 1032, the index associated with distance0 of the selected odd texel will be selected to determine the color of sample point 914. On the other hand, if it is determined at step 1030 that the MSB of the interpolated distance value $D_1$ for sample point 914 is 1, the sample point 914 is determined to be "in" relative to the closest type1 edge, and at step 1034, the index associated with distance1 of the selected odd texel will be selected to determine the color of sample point 914. As discussed above, in particular embodiments, the final index selected may then be used to determine the color of the sample point 914 based on the particular logic operation specified by the index to indicate whether the sample point 914 is a background (e.g., if the logic operation results in 0) or a foreground (e.g., if the logic operation results in 1). In other embodiments, the selected index may point to a particular entry in a color look-up table similar to that described above in relation to FIG. 3B. As an example, if the sample point 914 is determined to be closer in distance to the odd texel 922, and the MSB of the interpolated distance value $D_1$ for sample point 914 is determined to be 0, then the index associated with distance0 of the odd texel 922 will be selected to determine the color of sample point 914. Referencing FIG. 3B, if the 2-bit index of distance0 encodes for "1," then sample point 914 is determined to be coded red.

As can be seen from the embodiments described above for encoding color indices in a texel array using two distance fields and deducing the appropriate color index to use based on interpolation results, dual distance field labels can be configured to support more than two colors. Dual distance fields can be used to capture color information at the intersection between two edges to help preserve intersection data and better render the sharp corners of characters or glyphs.

Dual Distance Field Coarse Grain Color Selection

Figures 11A, 11B:
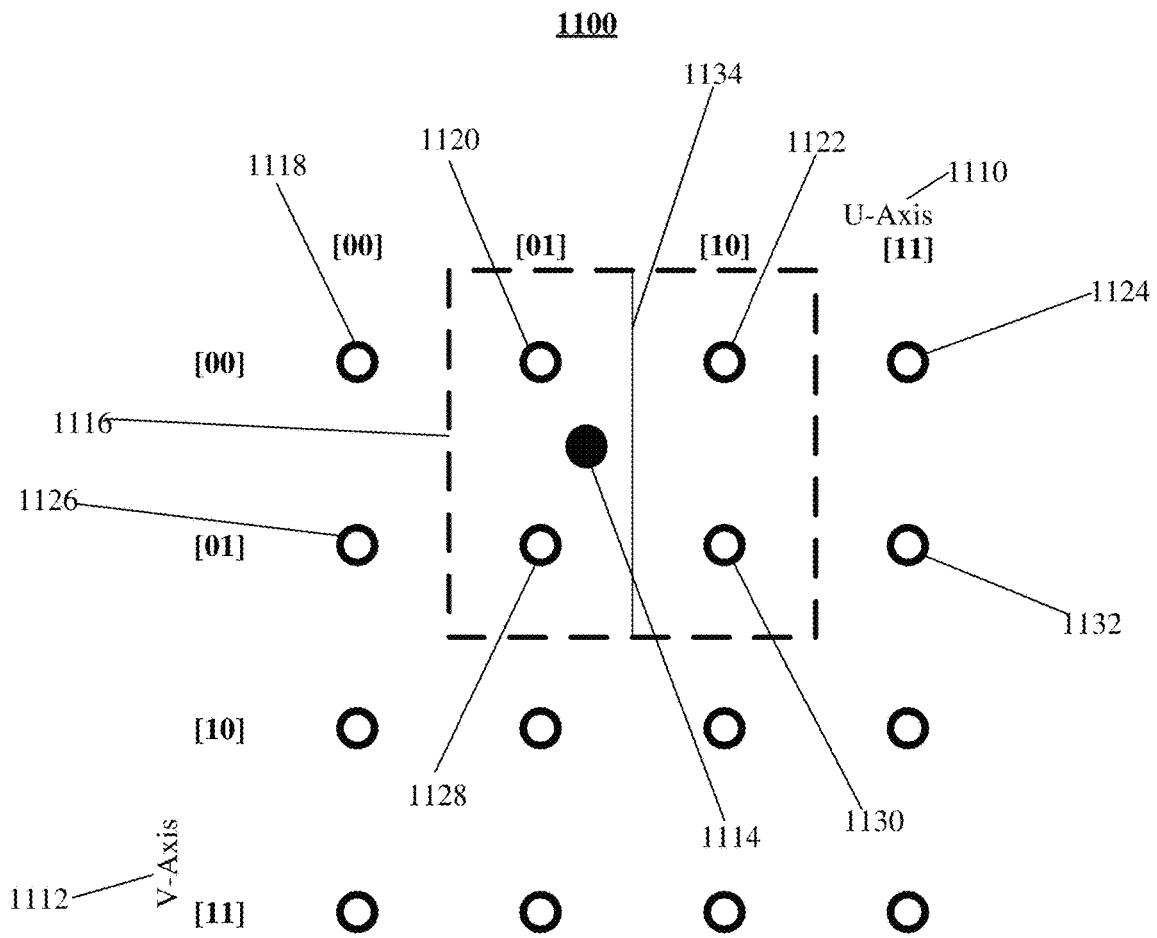
FIG. 11A illustrates using a coarse grain color index selection method on an array of texels associated dual distance fields.
FIG. 11B illustrates example distance field labels associated with aligned two-by-two sets of texels used for the coarse grain color index selection.

The discussion of the coarse grain, dual distance field color selection method for a sample point will focus on the embodiment shown in FIGS. 11A-11B and the method described in FIG. 12. Briefly, FIG. 11A illustrates using a coarse grain color index selection method on an array of texels having dual distance fields. FIG. 11B illustrates example distance fields associated with aligned two-by-two sets of texels used for the coarse grain color index selection. In addition, FIG. 12 illustrates an example method for using the coarse grain color index encoded with dual distance field texels to determine the color of a sample point.

FIG. 11A illustrates an example four-by-four array 1100 of texels. The sixteen texels in the array 1100 are arranged on a texture map at positions on a U-axis 1110 and V-axis 1112. In particular hardware embodiments, U and V coordinates are specified in binary numbers, starting with 00 (corresponding to decimal value 0) and ending with 11 (corresponding to decimal value 3). The circles represent texel positions in the texel array 1100. A sample point 1114 is selected (similar to how sample point 914 is selected above), and the color to be selected for sample point 1114 is determined using the coarse grain color selection method 1200, as discussed below.

The coarse grain, dual distance field color selection method 1200 differs, in at least one aspect, from the fine grain, dual distance field color selection method 1000 in that the coarse grain, dual distance field color selection method uses a pair of texels, rather than a single texel, to specify the desired color index for a region surrounding the texel pair (e.g., by concatenating the indices of each pair of horizontally aligned texels). As a result, the coverage area of each texel pair is larger than the coverage area of each texel used in the fine grain method. The benefit of using a pair of texels to encode the color index is that the number of bits available for encoding the index increases (e.g., from 2 bits to 4 bits), which means that more color options are available (e.g., from 4 to 16 colors). Since the first color table entry is typically set to transparent (i.e., no color), this leaves up to 15 unique colors that can be encoded by the 4-bit index used in the coarse grain, dual distance field color selection method.

As discussed above, for a dual distance field texel, each texel may have a distance0 and a distance1 value specifying, respectively, the texel's distance to the closest edge0 and the closest edge1. In addition, each of its distance value could be either "in" or "out," which means that there are four "in" and "out" combinations for each texel. In particular embodiments, as discussed in more detail below, dual distance field labels may encode for a desired color, or a foreground/background determination, for the four combinations of "in" and "out" using a coarse grain technique. In the coarse grain technique, the indices selected from a pair of texels may be concatenated to form a larger index value (e.g., two 2-bit indices could be concatenated to form a 4-bit index). In the dual distance field embodiment, each texel has two color indices: one associated with distance0 and the other associated with distance1. In particular embodiments, corresponding indices of the two aligned pairs of texels are concatenated together. For example, texel 1118 may have an index associated with distance0 and another index associated with distance 1; similarly, texel 1120 may have an index associated with distance0 and another index associated with distance 1. The respective distance0 indices of texels 1120 and 1118 may be concatenated to form a single 4-bit index associated with distance 0. Similarly, the respective distance1 indices of texels 1118 and 1120 may be concatenated to form a single 4-bit index associated with distance1. The resulting distance0 4-bit index and the distance1 4-bit index may both be stored with texels 1118 and 1120 so that they both have copies of the indices. As mentioned above, an index that is 4-bit in size would be able to point to 16 different colors in a color look-up table (e.g., with one transparent and 15 colors).

As shown in FIG. 12, the method 1200 may start at step 1210, where the indices of adjacent pairs of even-row or odd-row texels are concatenated and stored with both associated texels in the texel buffer in the pixel block. Similar to the embodiment described in relation to FIGS. 5A, 5B, and 6A, the pairs of texels in each even row (e.g., determined based on the least significant bit of the V position of the even texel being 0) may be used to encode the color index for the "out" case, and the pairs of texels in each odd row (e.g., determined based on the least significant bit of the V position of the odd texel being 1) may be used to encode the color index for the "in" case. To summarize, "even-row texel" refers to a texel on an even row of the texel array (e.g., the least significant bit of the V position of an even-row texture is 0), and "odd-row texel" refers to a texel on an odd row of the texel array (e.g., the least significant bit of the V position of an odd-row texture is 1). As an example, in FIG. 11A, texels 1118, 1120, 1122, and 1124 (all have v=00) are even-row texels, and texels 1126, 1128, 1130, and 1132 (all have v=01) are odd-row texels.

As shown in FIG. 11B, texels 1118, 1120, 1126, and 1128 are each associated with dual distance fields with concatenated indices. In particular embodiments, each texel may have a first distance field that includes a first 6-bit distance value, represented by distance0 or $D_0$, and an associated 4-bit concatenated color index, and a second distance field that also includes a first 6-bit distance value, represented by distance1 or $D_1$, and an associated 4-bit concatenated color index. The MSB bit of distance0 may encode whether the texel is "in" or "out" and the rest of the bits may specify the distance between the texel and the closest type0 edge. In addition, the MSB bit of distance1 may encode whether the texel is "in" or "out" and the rest of the bits may specify the distance between the texel and the closest type1 edge. Each concatenated color index of each of the texels 1118, 1120, 1126, and 1128 references an entry in a 16-entry color look-up table (e.g., the color look-up table shown in FIG. 6B).

In particular embodiments, in each region of the texel array 1100, the desired colors for the four "in"/"out" combinations may be specified, respectively, by the two concatenated color indices of adjacent pairs of texels. For example, the distance0 concatenated index of texel 1118, which is generated by concatenating the distance0 indices of texel 1118 and texel 1120, may indicate the desired color for the region covered by the pair of texels 1118, 1120, depending on which "in"/"out" combination is associated with the sample point 1114 (to be described in further detail below). In addition, the distance1 concatenated index of texel 1118, which is generated by concatenating the distance0 indices of texel 1118 and texel 1120, may also indicate the desired color for the same region depending on which "in"/"out" combination is associated with the sample point 1114 (the "in"/"out" combination associated with the distance1 concatenated index would be different from that of the distance0 concatenated index). In other words, the two concatenated indices of each texel may represent the desired color index for two different "in"/"out" combinations, one associated with distance0 and another associated with distance1. In particular embodiments, which two "in"/"out" combinations are represented by the two concatenated indices of each texel may be assigned in accordance with a predetermined pattern.

As an example, FIG. 11B illustrates an example of the pattern for a 2×2 set of aligned texels, such as a first set of texels 1118, 1120, 1126, and 1128, and similarly, a second set of texels 1122, 1124, 1130, and 1132. As shown, the concatenated index for distance0 of the even-row texels 1118 and 1120 (which is identical for both texels) specifies the desired color for the out/out case and the concatenated index for distance1 specifies the desired color for the out/in case. In addition, concatenated index for distance0 of the odd-row texels 1126 and 1128 (which is identical for both texels) specifies the desired color for the in/out case and the concatenated index for distance1 specifies the desired color for the in/in case. Similarly, this pattern may be repeated for adjacent texels 1122, 1124 and texels 1130, 1132. For example, the concatenated index for distance0 of the even-row texels 1122 and 1124 (which is identical for both texels) specifies the desired color for the out/out case and the concatenated index for distance1 specifies the desired color for the out/in case. In addition, concatenated index for distance0 of odd-row texels 1130 and 1132 (which is identical for both texels) specifies the desired color for the in/out case and the concatenated index for distance1 specifies the desired color for the in/in case. Moreover, this pattern may be repeated through the rest of texel array 1100. For example, this pattern for the aligned 2×2 texels may be repeated by the 2×2 texels located at (U,V) coordinates (00, 10), (01, 10), (00, 11), and (01, 11), and the 2×2 texels located at (10, 10), (11, 10), (10, 11), and (11, 11).

The pattern shown in FIG. 11B may be described in a variety of ways, such as in terms of even-row texels and odd-row texels. Each texel may be referred to as an even-row texel or odd-row texel, defined in the same manner as described above with reference to FIGS. 5A-5B. For example, as discussed above, even-row texels are located at V position v=00 ("even" since its LSB is 0) and thus would include texels 1118, 1120, 1122, and 1124. Of these four even-row texels, the two indices of the pair of adjacent even-row texels 1118 and 1120 are concatenated and the result is associated with the concatenated indices of both even-row texels, and the pair of adjacent even-row texels 1122 and 1124 are concatenated and the result is associated with the concatenated indices of both even-row texels. Likewise, odd-row texels are located at V position v=01 ("odd" since its LSB is 1) and thus would include texels 1126, 1128, 1130, and 1132. Of these four odd-row texels, the two indices of the pair of adjacent odd-row texels 1126 and 1128 are concatenated and the result is associated with the concatenated indices of both odd-row texels, and the two indices of the pair of adjacent odd-row texels 1130 and 1132 are concatenated and the result is associated with the concatenated indices of both odd-row texels.

The pattern shown in FIG. 11B may be described as follows: each even-row texel may have its concatenated distance0 index associated with the out/out combination and concatenated distance1 index associated with the out/in combination, and each odd-row texel may have its concatenated distance0 index associated with the in/out combination and concatenated distance1 index associated with the in/in combination. The pattern is repeated in an interleaved fashion. Within an aligned 2×2 set of texels, each distance0 index is associated with either the out/out or in/out combination, and each distance1 index is associated with either the out/in or in/in combination. It should be noted that although the in/out combination that is associated with each concatenated index may repeat, it does not mean that the index value itself needs to follow any particular pattern. For example, even though the texel 1118 and the texel located at (00, 10) may both have a distance0 index that is associated with the out/out combination, the distance0 index of texel 1118 may correspond to the color red while the distance0 index of the texel at (00, 10) may correspond to the color blue.

Similar to the coarse grain single distance field embodiment described above with reference to FIGS. 5A and 5B, the even and odd-row texels in the coarse grain dual distance field embodiment also specify, via their respective indices, the desired color for their respective coverage areas. For example, the even-row texels specify the colors for their respective coverage areas (e.g., as shown in FIG. 5A) and the odd-row texels specify the colors for their respective coverage areas (e.g., as shown in FIG. 5B). As will be described in more detail below, if the MSB of the interpolated distance0 for sample point 1114 is 0, the closest even-row texel may be selected. The selected even-row texel has two concatenated indices associated with distance0 and distance1. If the MSB of the interpolated distance1 for sample point 1114 is 0, the concatenated index associated with distance0 will be selected. On the other hand, if the MSB of the interpolated distance1 is 1, the concatenated index associated with distance1 will be selected. The selected concatenated index can then be used to determine the color for the sample point 1114, which is located within the coverage area of the selected even-row texel. As another example, if the MSB of the interpolated distance0 for sample point 1114 is 1, the closest odd-row texel may be selected.

The selected odd-row texel has two concatenated indices associated with distance0 and distance1. If the MSB of the interpolated distance1 for sample point 1114 is 0, the concatenated index associated with distance0 will be selected. On the other hand, if the MSB of the interpolated distance1 is 1, the concatenated index associated with distance1 will be selected. The selected concatenated index can then be used to determine the color for the sample point 1114, which is located within the coverage area of the selected odd-row texel.

The final index that has been selected may then be used to determine the color of the sample point 1114. As described above, particular embodiments of the concatenated index may specify a particular logic operation (e.g., AND, OR, XOR, NAND, NOR, XNOR, etc.) to be applied to the MSBs of the interpolated distance0 and distance1 values of the sample point 1114. The result of the logic operation may indicate whether the sample point 914 is a background (e.g., if the logic operation results in 0) or a foreground (e.g., if the logic operation results in 1). In other embodiments, the selected concatenated index may point to a particular entry in a color look-up table with up to 16 different entries (e.g., FIG. 6B).

Returning to the method 1200 shown in FIG. 12, at step 1212, the four nearest texels to sample point 1114 are determined. FIG. 11A illustrates that the four nearest texels to sample point 1114 are texel 1120, texel 1122, texel 1128, and texel 1130. Then, at step 1214, the distance values distance0 ($D_0$) and distance1 ($D_1$) for sample point 1114 are interpolated based on the corresponding distance0 and distance1 values of each of texels 1120, 1122, 1128, and 1130. In particular embodiments, the interpolated distance $D_0$ specifies the distance between the sample point 1114 and the closest type0 edge, and the interpolated distance $D_1$ specifies the distance between the sample point 1114 and the closest type1 edge. Next, at step 1216, the highest order bit of the interpolated distance value $D_0$ for sample point 1114 is determined to be either 0 or 1. In order words, if the MSB of the interpolated distance value $D_0$ for sample point 1114 is determined to be 0, then sample point 1114 is determined to be "out" relative to the closest type0 edge (i.e., outside the region defined by the closest type0 edge). On the other hand, if the MSB of the interpolated distance value $D_0$ for sample point 1114 determined to be 1, then sample point 914 is determined to be "in" relative to the closest type0 edge (i.e., inside the region defined by the closest type0 edge).

If it is determined at step 1216 that the MSB of the interpolated distance value $D_0$ for sample point 1114 is 0, then at step 1218, the sample point 1114 is determined to be "out" relative to the closest type0 edge, and thus two even-row texels are selected from the closest two-by-two texel region 1116. The even-row texels are defined in the same manner as described above with reference to FIGS. 5A-5B. Specifically, within the two-by-two texel region 1116, texels 1120 and 1122 may be considered as even-row texels because the LSBs of their V coordinate equals 0. Thus, in this example where the MSB of the interpolated distance $D_0$ is 0, texels 1120 and 1122 are selected.

Then, at step 1220, the method 1200 determines which of the selected two even-row texels is closer in distance to the sample point 1114. This is determined similar to the single distance, coarse grain embodiment described in FIG. 6A and step 760 of the method 700 of FIG. 7. Specifically, one way for hardware to determine which of the two even-row texels is closer to sample point 1114 is by determining, conceptually, which side of the vertical line 1134 the sample point 1114 falls on (e.g., by determining whether the sample point 1114 is less than or equal to 0.5 texels, or alternatively, greater than 0.5 texels, from the closest integer U-axis position, as discussed above). As an example, for the even-row texels 1120 and 1122, any point on or to the left of vertical line 1134 would have a distance from a closest integer U-axis position (e.g., u=01) that is less than or equal to 0.5 texels. If so, then the concatenated indices (e.g., including the concatenated distance0 index and the concatenated distance1 index) of even-row texel 1120 (i.e., the "left" even-row texel) would be deemed closer to the sample point 1114, and therefore, tentatively selected. Conversely, any point to the right of vertical line 1134 would have a distance from the closest integer U-axis position (e.g., u=01) than is greater than 0.5 texels. If so, then the concatenated indices (e.g., including the concatenated distance0 index and the concatenated distance1 index) of even-row texel 1122 (i.e., the "right" even-row texel) would be deemed closer to sample point 1114, and therefore, tentatively selected.

Since two concatenated indices, the concatenated distance0 index and the concatenated distance1 index, are associated with the even-row texel 1120, the method 1200 next determines which concatenated index of even-row texel 1120 to use. To make this determination, at step 1222, the method 1200 determines whether the highest order bit of the interpolated distance value $D_1$ for sample point 1114 is either 0 or 1. If it is determined at step 1222 that the MSB of the interpolated distance value $D_1$ for sample point 1114 is 0, the sample point 1114 is determined to be "out" relative to the closest type1 edge, and at step 1224, the concatenated index associated with distance0 of the selected even-row texel 1120 will be selected to determine the color of sample point 1114. On the other hand, if it is determined at step 1122 that the MSB of the interpolated distance value $D_1$ for sample point 1114 is 1, the sample point 1114 is determined to be "in" relative to the closest type1 edge, and at step 1224, the concatenated index associated with distance1 of the selected even-row texel 1120 will be selected to determine the color of sample point 1114. As discussed above, in particular embodiments, the final index selected may then be used to determine the color of the sample point 1114 based on the particular logic operation specified by the index to indicate whether the sample point 1114 is a background (e.g., if the logic operation results in 0) or a foreground (e.g., if the logic operation results in 1). In other embodiments, the selected index may point to a particular entry in a color look-up table similar to that described above in relation to FIG. 6B. As an example, if the sample point 1114 is determined to be closer in distance to the even-row texel 1120, and the MSB of the interpolated distance value $D_1$ for sample point 1114 is determined to be 0, then the index associated with distance0 of the even-row texel 1120 will be selected to determine the color of sample point 1114. Referencing FIG. 6B, if the 4-bit concatenated index of distance0 encodes for "3," then sample point 1114 is determined to be coded blue.

On the other hand, if it is determined at step 1216 that the MSB of the interpolated distance value $D_0$ for sample point 1114 is 1, then at step 1228, the sample point 114 is determined to be "in" relative to the closest type0 edge, and thus two odd-row texels are selected from the two-by-two texel region 1116. The odd-row texels are defined in the same manner as described above with reference to FIGS. 5A-5B. Specifically, within the two-by-two texel region 1116, texels 1128 and 1130 may be considered as odd-row texel because the LSBs of its V coordinate are 1. Thus, texels 1128 and 1130 are selected as the two odd-row texels within the two-by-two texel region 1116.

Then, at step 1230, the method 1200 determines which odd-row texel of the selected two odd-row texels is closer in distance to the sample point 1114. This is determined similar to the embodiment described in FIG. 6A and step 780 of the method 700 of FIG. 7. Specifically, similar to the determination for even-row texels described above, one way for hardware to determine which of the two odd-row texels is closer to sample point 1114 is by determining, conceptually, which side of the vertical line 1134 the sample point 1114 falls on (e.g., by determining whether the sample point 1114 is less than or equal to 0.5 texels, or alternatively, greater than 0.5 texels, from the closest integer U-axis position, as discussed above). As an example, for the odd-row texels 1128 and 1130, any point on or to the left of vertical line 1134 would have a distance from a closest integer U-axis position (e.g., u=01) that is less than or equal to 0.5 texels. If so, then the concatenated indices (e.g., including the concatenated distance0 index and the concatenated distance1 index) of odd-row texel 1128 (i.e., the "left" odd-row texel) would be deemed closer to the sample point 1114, and therefore, tentatively selected. Conversely, any point to the right of vertical line 1134 would have a distance from the closest integer U-axis position (e.g., u=01) than is greater than 0.5 texels. If so, then the concatenated indices (e.g., including the concatenated distance0 index and the concatenated distance1 index) of odd-row texel 1130 (i.e., the "right" odd-row texel) would be deemed closer to sample point 1114, and therefore, tentatively selected.

Since two concatenated indices, the concatenated distance0 index and the concatenated distance1 index, are associated with the odd-row texel 1128, the method 1200 next determines which concatenated index of odd-row texel 1128 to use. To make this determination, at step 1232, the method 1000 determines whether the highest order bit of the interpolated distance value $D_1$ for sample point 1114 is either 0 or 1. If it is determined at step 1232 that the MSB of the interpolated distance value $D_1$ for sample point 1114 is 0, the sample point 1114 is determined to be "out" relative to the closest type1 edge, and at step 1234, the concatenated index associated with distance0 of the selected odd-row texel will be selected to determine the color of sample point 1114. On the other hand, if it is determined at step 1232 that the MSB of the interpolated distance value $D_1$ for sample point 1114 is 1, the sample point 1114 is determined to be "in" relative to the closest type1 edge, and at step 1236, the concatenated index associated with distance1 of the selected odd-row texel will be selected to determine the color of sample point 1114. As discussed above, in particular embodiments, the final index selected may then be used to determine the color of the sample point 1114 based on the particular logic operation specified by the concatenated index to indicate whether the sample point 1114 is a background (e.g., if the logic operation results in 0) or a foreground (e.g., if the logic operation results in 1). In other embodiments, the selected concatenated index may point to a particular entry in a color look-up table similar to that described above in relation to FIG. 6B. As an example, if the sample point 1114 is determined to be closer in distance to the odd-row texel 1128, and the MSB of the interpolated distance value $D_1$ for sample point 1114 is determined to be 0, then the concatenated index associated with distance0 of the odd-row texel 1128 will be selected to determine the color of sample point 1114. Referencing FIG. 6B, if the 4-bit concatenated index of distance0 encodes for "1," then sample point 1114 is determined to be coded red.

The example discussed above describes the situation in which the sample point 1114 is located at a position between two sets of aligned texels (e.g., the first set includes texels 1118, 1120, 1126, and 1128 and the second set includes texels 1122, 1124, 1130, and 1132), which also means that the four neighboring texels (e.g., 1120, 1122, 1128, and 1130) may have unique 4-bit concatenated indices. In other words, as shown in FIG. 11A, sample point 1114 is located between the pair of even-row texels 1118, 1120 and the pair of even-row texels 1122, 1124, and similarly between the pair of odd-row texels 1126, 1128 and the pair of odd-row texels 1130, 1132. However, a sample point may instead be located within an aligned set of 2×2 texels (e.g., within texels 1118, 1120, 1126, 1128), which means that the even-row texels (e.g., 1118 and 1120) would have identical 4-bit concatenated indices and the odd-row texels (e.g., 1126 and 1128) would have identical 4-bit concatenated indices. As an example, assume there is a sample point located at $(U_3, V_3)$ between the texels of the pair of even-row texels 1118, 1120, and between the texels of the pair of odd-row texels 1126, 1128. In this situation, the 4 closest texels to the sample point would include the texels 1118, 1120, 1126, and 1128. Using the method 1200 described above, after determining whether to choose the even-row texel pair (if the interpolated distance0's MSB=0) or the odd-row texel pair (if the interpolated distance0's MSB=1), selecting the closest even-row or odd-row texel by computing whether $U_3'=U_3$ mod 1>0.5 or ≤0.5 leads to a result that is contrary to the conceptual idea of selecting the closest texel. As an example, if the even-row texel pair 1118, 1120 is selected (based on the interpolated distance0's MSB=0), and it is determined that $U_3'=U_3$ mod 1>0.5, then the index of the even-row texel at the even U position (i.e., the U position whose least significant bit is 0) is selected. However, this would lead to the selection of the "left-side" even-row texel 1118 (since its U position is 00), even though conceptually the determination that $U_3'>0.5$ indicates that the "right-side" even-row texel 1120 is closer. Despite this seemingly incongruous result, because even-row texels 1118 and 1120 have the same concatenated indices, the end result of which even-row texel's index is selected is inconsequential. In a similar manner, the same result would occur when selecting between the pair of odd-row texels 1126, 1128.

As can be seen from the embodiments described above for encoding concatenated color indices in a texel array using two distance fields and deducing the appropriate color index to use based on interpolation results, dual distance field labels with concatenated color indices of adjacent texels can be configured to support up to 16 colors (e.g., a "transparent" color and up to 15 unique colors). Similar to the fine grain, dual distance field technique, this coarse grain, dual distance fields technique can be used to capture color information at the intersection between two edges to help preserve intersection data and better render the sharp corners of characters or glyphs.

Distance-Field Optimization Techniques

Mixed Distance Field Mipmap

Particular embodiments of distance field labels may produce suboptimal results in certain scenarios. For example, the distance field labels described above are ideally used when the horizontal and vertical distances between edges are at least two texels, and diagonal distances are either square-root-of-2 texels (for fine grain index) or two times the square-root-of-2 texels (for coarse grain index). When such characteristics are satisfied, distance filed labels may produce quality rendering with respect to sharpness, accuracy, and minimal distortion and artifacts (e.g., pixelation, etc.).

However, when the distance between two edges is below two texels, there is an inherent ambiguity as to which edge is measured by the distance value of a texel located between those edges. In such a scenario, the rendered label may be subject to pixilation artifacts that, in turn, could cause motion artifacts to appear.

Particular embodiments described herein relate to a robust mipmap for a label texture that can accommodate different scaling requirements, including those where the distance between two edges in the label is less than two texels wide. The mipmap may include different mipmap levels, each of which corresponding to a particular resolution of the label texture. In particular embodiments, an original high-resolution label may be used to generate a series of labels with different resolution. For example, the original label may be filtered (e.g., using bilinear interpolation) to generate one or more lower-resolution labels.

Figure 13:
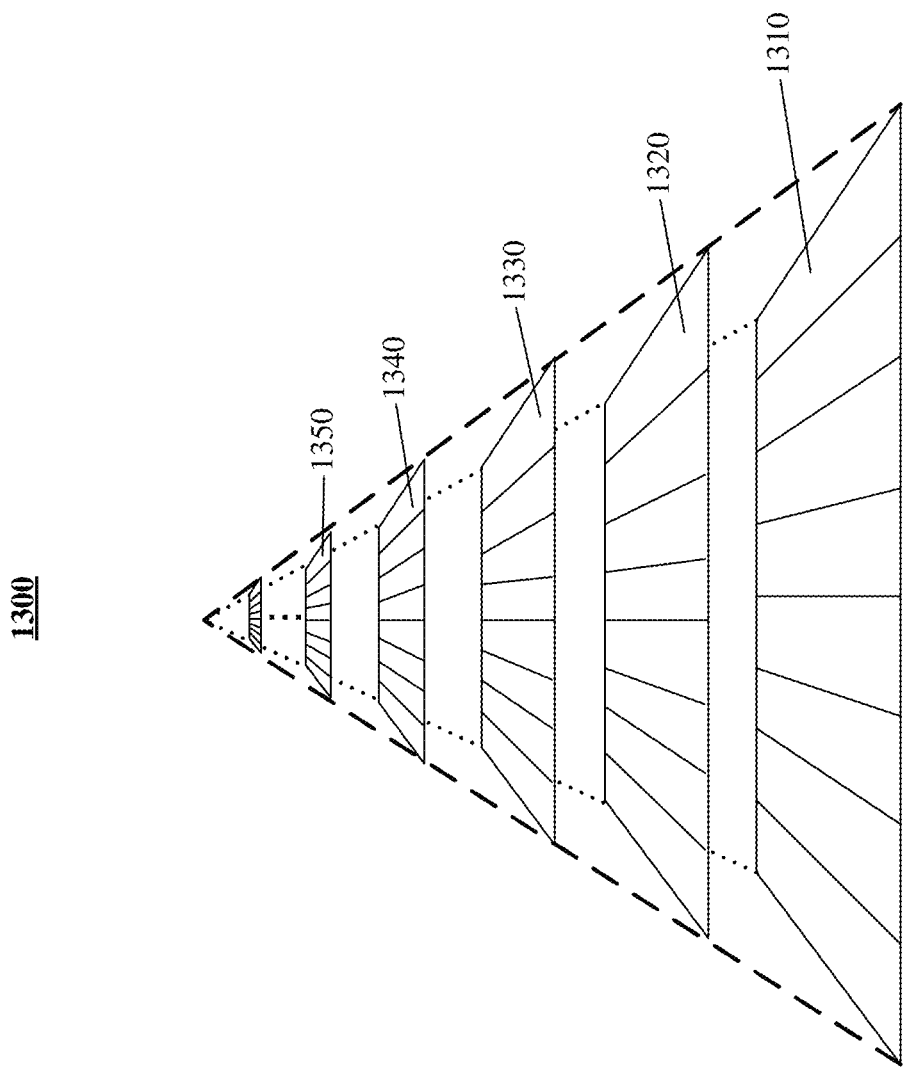
FIG. 13 illustrates an example mipmap with mixed distance-field textures and RGBA textures.

FIG. 13 illustrates an example mipmap 1300 for a particular label texture. The mipmap 1300 includes a plurality of mipmap levels, each corresponding to the label at a different resolution. For example, the largest mipmap level 1310 may have a resolution of 256×256 texels. The rest of the mipmap levels may have progressively lower resolutions (e.g., with each dimension in powers of 2), such as 128×128 texels (mipmap level 1320), 64×64 texels (mipmap level 1330), 32×32 texels (mipmap level 1340), 16×16 texels (mipmap level 1350), and so on. The mipmap level chosen for sampling the color of a pixel may be based on the ratio between the size of a texel and the size of a sample pixel in texture space. For example, when selecting a mipmap level, the rendering system may determine the texel-to-pixel ratio for a projected pixel to determine what mipmap level to use. In particular embodiments, the mipmap level chosen is the one with texels that are similar in size to the sampling pixels (in other words, the texel-to-pixel ratio is closest to 1). The texture map at the selected mipmap level is then sampled to determine the color to be used. For example, initially, a label displayed to the user may be generated from a 64×64 mipmap level. When the user zooms out, the label would appear smaller, and as such a lower resolution mipmap level (e.g., 8×8) may be selected to generate the label. However, as described above, when the resolution of a label texture decreases to a certain extent such that the distance between two edges of the label (e.g., the width of the letter "I") is less than two texels, the rendering result would be suboptimal.

To address the aforementioned issues with distance field labels, particular embodiments may generate a mipmap for a label with two types of mipmap levels: mipmap level(s) defined using distance fields and mipmap level(s) defined using RGBA. For example, one or more higher-resolution mipmap levels may be defined using distance field textures and one or more lower-resolution mipmap levels may be defined using RGBA textures. Such a mipmap leverages the benefits afforded by distance fields (e.g., sharper rendered labels with less distortion and artifacts) while eliminating the aforementioned shortcomings of distance fields at lower resolutions. In particular, when the distance between two edges in a label is greater than or equal to two texels, then using the mipmap levels defined by distance fields for label rendering would provide quality results. However, as discussed above, when the distance between two edges is less than two texels, the mipmap levels defined by RGBA components, rather than distance fields, may be used for rendering. Although RGBA labels at higher resolutions do not perform as well as distance field labels (since edges in RGBA textures are prone to blurring when interpolated), they are more suitable than distance field labels at lower resolutions. The problem of using distance fields when the features are too narrow is aliasing: edges could be skipped entirely, resulting in pixilation artifacts. Although switching to RGBA would replace the pixilation artifacts with something that may appear blurry on close inspection, the blurriness is introduced where the feature details are too small to be noticeable.

In particular embodiments, a label that is processed by a rendering system or display engine may be associated with attributes that indicate the number of mipmap levels in its mipmap that are implemented using distance fields and the number of mipmap levels that are defined in RGBA. For example, if a label has four mipmap levels, a two-bit attribute may specify the number of high-resolution mipmap levels that are defined using distance fields. For example, a two-bit attribute of 10, corresponding to the decimal number 2, would indicate that the two higher-resolution mipmap levels are defined using distance fields. The rest of the lower-resolution mipmap levels would be deemed to be defined in RGBA. Continuing the example above, since the two-bit attribute indicates that two of the four mipmap levels are defined by distance fields, the remaining two lower-level mipmap levels would be defined in RGBA. Although the mipmap levels defined in RGBA may introduce some unwanted artifacts when rendered, their visual impact on the overall scene would likely be minimal and unnoticeable since their screen coverage area would likely be small (which is why the lower-resolution mipmap level was chosen in the first place).

Using this attribute information, a display engine may render a label as follows. The display engine may load a 3D surface definition into memory and perform visibility tests to determine which parts of the 3D surface is visible to which pixels on the screen. In particular embodiments, this primary visibility test may be performed using ray casting. For example, based on the user's viewpoint, a conceptual ray may be cast from a particular pixel of a screen positioned in 3D view space and into the view space in which the 3D surface is positioned. The intersection between the ray and the 3D surface may indicate that the point of intersection is visible through the pixel, and therefore the pixel's color would depend on the texture corresponding to the point of intersection. Thus, once the point of intersection in 3D space is determined, it is transformed into 2D texture space of the texture associated with the surface to determine which portion of the texture to sample. In other embodiments, instead of casting individual rays per pixels, a ray bundle may be cast for a tile of pixels (e.g., a tile may be 16×16 pixels). In particular, the ray bundle may be cast from the four corners of the tile, which is conceptually similar to projecting the tile into 3D space to determine whether and where it intersects with the surface. The area of intersection is then transformed from 3D space into 2D texture space. Since a tile represents, e.g., 16×16 pixels, the same number of 16×16 sample points will be determined within the area of intersection in texture space.

When sampling, the display engine may determine which mipmap level to use for sampling. In particular embodiments, the display engine may select the mipmap level whose texels are most similar in size to the sampling pixel size (e.g., with a texel-to-pixel ratio that is closest to one-to-one). The display engine may then determine whether the selected mipmap level is defined using distance fields or RGBA. For example, in embodiments where each surface has a two-bit (or any other bit size) attribute value indicating the number of mipmap levels in its mipmap that are defined using distance fields (or RGBA), the system may deduce whether the selected mipmap level is defined by distance field or RGBA. For example, if the selected mipmap level is 1 (e.g., the levels may range from 0 to 3, with 0 being the highest-resolution mipmap level and with 3 being the lowest), the display engine may conclude that it is defined using distance fields since the two-bit attribute indicates that the two highest-resolution mipmap levels correspond to distance field textures. Using the same logic, if the selected mipmap level is 2, the display engine may conclude that the corresponding texture is defined using RGBA. Once the display engine determines which type of texture it is using, it may invoke the appropriate rendering logic to handle the subsequent sampling process. For example, for distance field labels, the aforementioned process for single distance filed or dual distance field filtering process may be used to determine the colors of the sampling points. For RGBA labels, the display engine may identify the four nearest texels to the sampling point and perform bilinear interpolation on the colors of those texels. By using the mixed mipmap that includes both mipmap levels defined using distance fields and mipmap levels defined using RGBA, the display engine is able to accommodate different rendering scales without loss of quality due to the limitations of distance fields.

Figure 14:
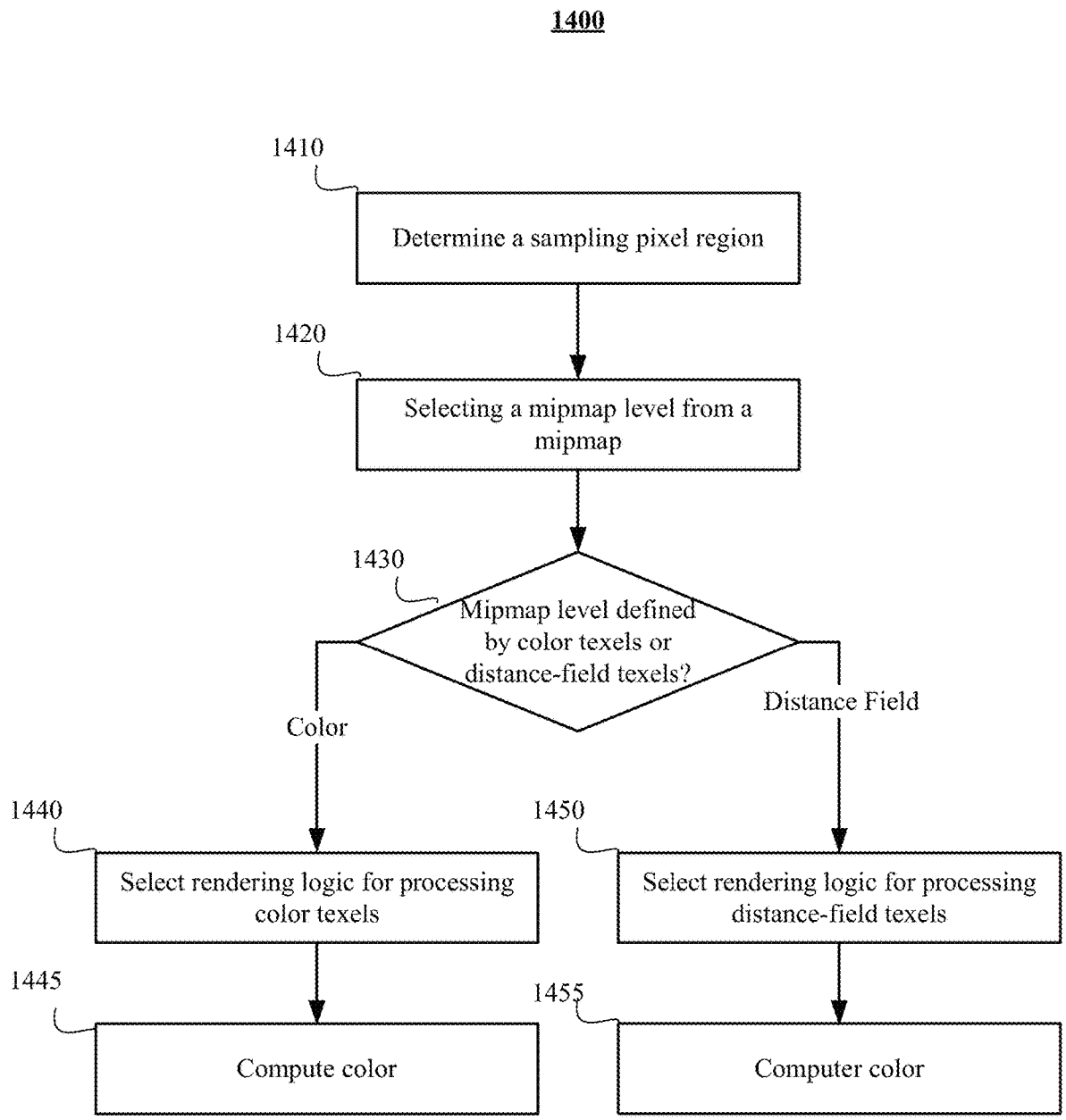
FIG. 14 illustrates an example method for computing a color value for a pixel using a mipmap with mixed mipmap levels.

FIG. 14 illustrates an example method 1400 for computing a color value for a pixel using a mipmap with mixed mipmap levels. The method may begin at step 1410, where a computing system may a sampling pixel region within a texture. The texture may be associated with mipmap levels having different resolutions of the texture. The mipmap levels may be generated from the original texture. The mipmap levels may include at least a first mipmap level defined by color texels and a second mipmap level defined by distance-field texels. The first mipmap level defined by color texels may have a lower resolution than the second mipmap level defined by distance-field texels. The first mipmap level may have the lowest resolution in the mipmap and the second mipmap level defined by distance field texels may have the highest resolution in the mipmap.

At step 1420, the system may select one of the mipmap levels based on a size of the sampling pixel region and a size of a texel in the selected mipmap level. For example, the selected mipmap level may be selected based on a ratio between the size of the sampling pixel region and the size of each texel in the selected mipmap level. For instance, the system may identify a mipmap level whose texel sizes are similar to the size of the sampling pixel region (e.g., the pixel size to texel size ratio is close to 1-to-1).

At step 1430, the system may determine whether the selected mipmap level is defined by color texels or distance-field texels. If the system determines that the selected mipmap level is defined by color texels, then at step 1440, the system may select a corresponding rendering logic configured to process color texels. Then at step 1445, the selected rendering logic may process the color texels to compute a color value for the sampling pixel region using the selected mipmap level. For example, the rendering logic may identify, from the selected mipmap level, the four closest color texels relative to the sampling pixel region and perform bilinear interpolation or bicubic interpolation to compute the color value for the sampling pixel region.

If, on the other hand, the system determines that the selected mipmap level is defined by distance-field texels, then at step 1450 it may select a second rendering logic configured to process distance-field texels. Then at step 1455, the system may compute a color value for the sampling pixel region using the selected second rendering logic and the mipmap level defined by distance-field texels. The rendering logic may be the based on the embodiments described above with reference to FIGS. 4, 7, 10, or 12.

Eliminating Interpolation Based on Comparison of MSB

In particular embodiments, the process of interpolating the distance fields of the nearest four texels to determine an interpolated distance (or two distances in the case of dual distance field labels) for a sample point on a texture map may be optimized in situations where the MSB of the distance fields of the nearest four texels are the same. As described in further detail above, the main purpose for interpolating the distance fields of the nearest for texels is to determine whether the sample point is "in" or "out," which is indicated by the MSB of the interpolated distance. As such, in situations where the four distance fields of the four nearest texels all have the same MSB (e.g., 0 or 1), the MSB for the sample point can simply be selected to be the same MSB without having to calculate the interpolated distance (e.g., using point sampling rather than bilinear interpolation sampling). Being able to determine the MSB without having to perform bilinear interpolation helps to optimize operational efficiency and remove unnecessary calculation-heavy processing steps. The MSB determined in this manner may then be used to select the appropriate texel whose color index specifies the color for the sample point, as described above.

As an example, in the method 400 for determining the color of a sample point using a single distance field texel array with a fine grain color index, as shown in FIG. 4, after the four nearest texels to the sample point 314 are determined in step 410 and before the distance for sample point 314 is computed via bilinear interpolation based on the distance fields of texels 318, 320, 322, and 324, the pixel block may conduct a preliminary analysis to determine whether the MSBs of the distance fields of the four texels 318, 320, 322, and 324 are the same. If, for example, the MSBs of the distance fields of all four texels 318, 320, 322, and 324 are all 0 (i.e., "out"), then the MSB of the interpolated distance of sample point 314, if it were to be computed, must also be 0. As such, the pixel block can simply bypass the interpolation step 420, which is computationally expensive, and proceed to steps 440 and the subsequent steps to identify the texel whose color index specifies the color for of the sample point 314. If, on the other hand, the MSBs of the distance fields of all four texels 318, 320, 322, and 324 are all 1 (i.e., "in"), then the MSB of the sample point 314 must also be 1, and the method 400 can simply bypass the interpolation step 420 and proceed to step 460 and the subsequent steps to determine which texel's color index is to be used. This optimization technique may also be used in the embodiment where coarse color indices are defined for single distance field texels.

A similar optimization technique may be applied in the dual distance filed embodiments. In both the fine grain index and coarse grain index embodiments, the sample point's "in" or "out" statuses with respect to distance0 and distance1 are used to select the color index for the sample point. In the embodiments described above, whether the sample point is "in" or "out" with respect to the closest type0 edge is determined by the MSB of its interpolated distance0, which is computed using the distance0 values of the four nearest texels. If the MSBs of the distance0 values of the four nearest texels are the same (e.g., all 1s or all 0s), then the MSB of the sample point's distance0 value may be set to the same MSB (e.g., via point sampling). Similarly, whether the sample point is "in" or "out" with respect to the closest type1 edge is determined by the MSB of its interpolated distance1, which is computed using the distance1 values of the four nearest texels. If the MSBs of the distance1 values of the four nearest texels are the same (e.g., all 1s or all 0s), then the MSB of the sample point's distance1 value may be set to the same MSB (e.g., via point sampling). The two MSBs of the sample point (i.e., one associated with distance0 and the other associated with distance1) may be independently computed, which means that one, both, or neither may be computed using the optimization technique. For example, the MSB associated with distance0 may be computed using the optimization technique while the MSB associated with distance1 may be computed using bilinear interpolation. Once the two MSBs have been determined, the pixel block may use them to select the appropriate index for the sample point, as described in more detail elsewhere herein.

Figure 15:
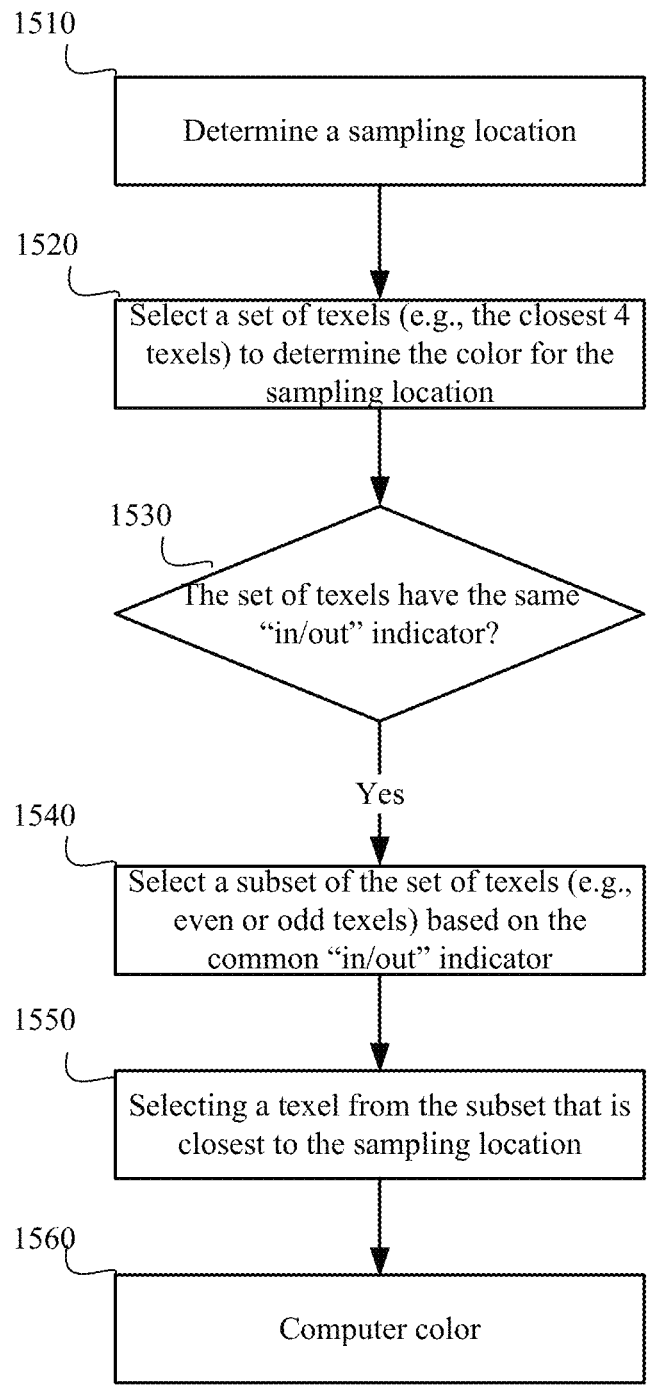
FIG. 15 illustrates an example method for determining the color for a sampling location without interpolation.

FIG. 15 illustrates an example method 1500 for determining the color for a sampling location without interpolation. The method may begin at step 1510, where a computing system may determine a sampling location within a texture that comprises a plurality of texels. Each texel may encode a distance field indicating (1) a distance between the texel and an edge depicted in the texture and (2) an indicator indicating whether the texel is on a first predetermined side of the edge or a second predetermined side of the edge. For instance, the indicator may encode whether the texel is "in" or "out" relative to the edge. At step 1520, the system may select, based on the sampling location, a set of texels in the plurality of texels to use to determine a color for the sampling location. For example, the system may select the four closest texels to the sampling location. At step 1530, the system may determine whether the set of texels have the same indicators. If the indicators are different (e.g., some texels are "in" and some texels are "out"), then interpolation may be used to compute the color for the sampling location, such as in accordance with the embodiments described above with reference to FIGS. 4, 7, 10, or 12. However, if it is determined that the set of texels have the same indicators, then at step 1540 the system may select, based on the indicator of any texel in the set of texels, a subset of the set of texels. For example, if the common indicator between the four texels is "out", then the two even texels may be selected. On the other hand, if the four texels are "in," then the two odd texels may be selected. At step 1550, the system may select a texel from the subset of texels based on a distance between the texel and the sampling location. Then at step 1560, the system may determine the color for the sampling location using the selected texel. For example, each of the texels may encode a color index into a color table (e.g., FIG. 3b) that may be used to determine the color for the sampling location.

Detecting Transparent Result to Allow Discarding of Pixel

In particular embodiments, using the distance fields of the nearest four texels to determine an interpolated distance(s) for a sample point on a texture map may be optimized and/or eliminated in situations where the distance field color indices that apply to the sample point are transparent. This can occur in two different scenarios. The first scenario is where the color indices of the distance fields of the nearest four texels to the sample point all correspond to "transparent" in the color table entry. The second scenario is where the sample point is determined to be outside the texel array (e.g., more than ½ texel length outside the texel array) and thus deemed to be transparent. In these scenarios, the sample point can simply be deemed to be transparent, thereby removing unnecessary calculation-heavy processing steps, such as bilinear interpolation.

As an example of the first scenario, in the method 400 for using the fine grain color index to determine the color of a sample point in a single distance field texel array, after the four nearest texels to sample point are determined in step 410 and before the distance for sample point 314 is computed via bilinear interpolation, the method can conduct a preliminary analysis to determine whether the color index of each of the four texels 318, 320, 322, and 324 corresponds to "transparent." If this is the case, then the method 400 can skip the remaining steps and simply code the sample point as transparent. The same preliminary analysis may be performed in the coarse grain, single distance field embodiments. For the dual distance field embodiments (i.e., fine grain and coarse grain), a similar preliminary analysis may be performed to determine whether all the candidate color indices (including those associated with distance0 and distance1) associated with the four nearby texels correspond to "transparent." If so, then the sample point may be directly marked as being "transparent" without performing bilinear interpolation.

Systems and Methods

Figure 16:
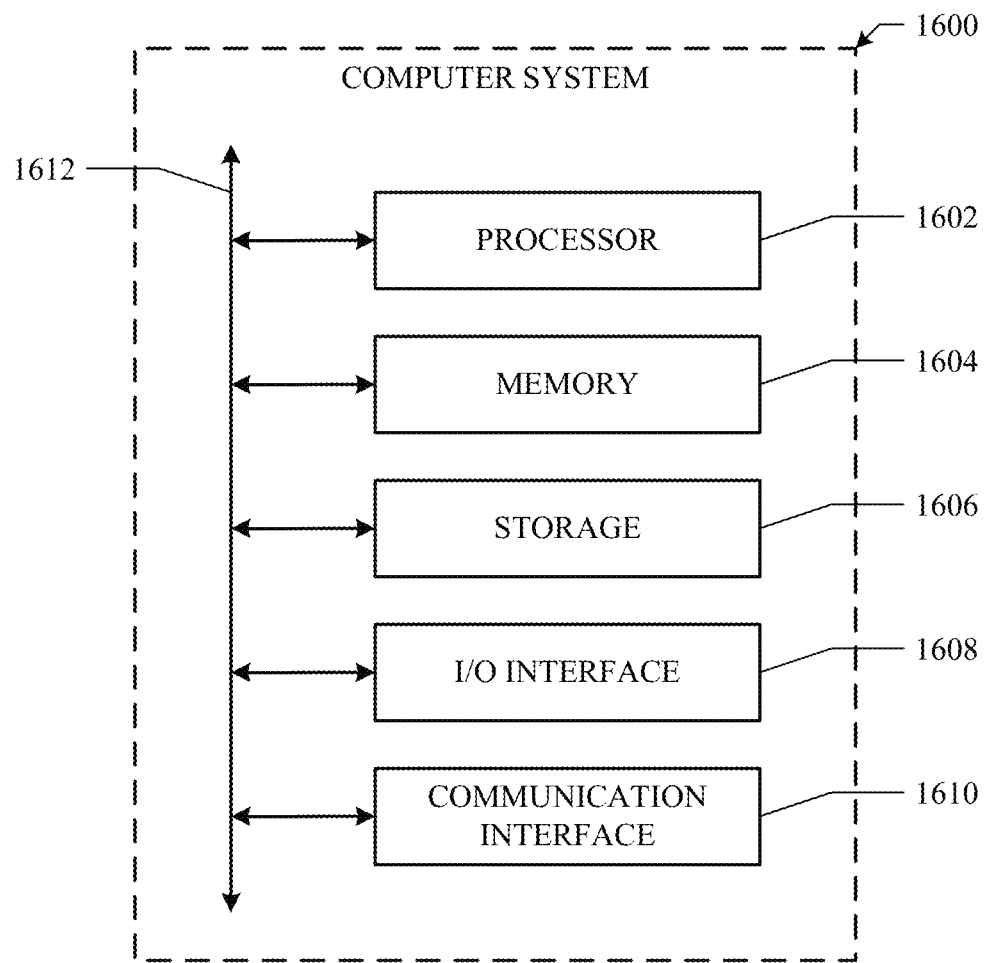
FIG. 16 illustrates an example computer system.

FIG. 16 illustrates an example computer system 1600. In particular embodiments, one or more computer systems 1600 perform one or more steps of one or more methods described or illustrated herein. In particular embodiments, one or more computer systems 1600 provide functionality described or illustrated herein. In particular embodiments, software running on one or more computer systems 1600 performs one or more steps of one or more methods described or illustrated herein or provides functionality described or illustrated herein. Particular embodiments include one or more portions of one or more computer systems 1600. Herein, reference to a computer system may encompass a computing device, and vice versa, where appropriate. Moreover, reference to a computer system may encompass one or more computer systems, where appropriate.

This disclosure contemplates any suitable number of computer systems 1600. This disclosure contemplates computer system 1600 taking any suitable physical form. As example and not by way of limitation, computer system 1600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks. Where appropriate, one or more computer systems 1600 may perform without substantial spatial or temporal limitation one or more steps of one or more methods described or illustrated herein. As an example and not by way of limitation, one or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

In particular embodiments, computer system 1600 includes a processor 1602, memory 1604, storage 1606, an input/output (I/O) interface 1608, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606. In particular embodiments, processor 1602 may include one or more internal caches for data, instructions, or addresses. This disclosure contemplates processor 1602 including any suitable number of any suitable internal caches, where appropriate. As an example and not by way of limitation, processor 1602 may include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602. Data in the data caches may be copies of data in memory 1604 or storage 1606 for instructions executing at processor 1602 to operate on; the results of previous instructions executed at processor 1602 for access by subsequent instructions executing at processor 1602 or for writing to memory 1604 or storage 1606; or other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs); be a multi-core processor; or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. As an example and not by way of limitation, computer system 1600 may load instructions from storage 1606 or another source (such as, for example, another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere). One or more memory buses (which may each include an address bus and a data bus) may couple processor 1602 to memory 1604. Bus 1612 may include one or more memory buses, as described below. In particular embodiments, one or more memory management units (MMUs) reside between processor 1602 and memory 1604 and facilitate accesses to memory 1604 requested by processor 1602. In particular embodiments, memory 1604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memories 1604, where appropriate. Although this disclosure describes and illustrates particular memory, this disclosure contemplates any suitable memory.

In particular embodiments, storage 1606 includes mass storage for data or instructions. As an example and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. In particular embodiments, storage 1606 is non-volatile, solid-state memory. In particular embodiments, storage 1606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1606 taking any suitable physical form. Storage 1606 may include one or more storage control units facilitating communication between processor 1602 and storage 1606, where appropriate. Where appropriate, storage 1606 may include one or more storages 1606. Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include one or more of these I/O devices, where appropriate. One or more of these I/O devices may enable communication between a person and computer system 1600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1608 for them. Where appropriate, I/O interface 1608 may include one or more device or software drivers enabling processor 1602 to drive one or more of these I/O devices. I/O interface 1608 may include one or more I/O interfaces 1608, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1610 for it. As an example and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example and not by way of limitation, bus 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   determining, by a computing system, a sampling pixel region within a texture, wherein the texture is associated with mipmap levels having different resolutions of the texture, wherein the mipmap levels include at least a first mipmap level defined by color texels and a second mipmap level defined by distance-field texels;
   selecting, by the computing system, one of the mipmap levels based on a size of the sampling pixel region and a size of a texel in the selected mipmap level; and
   computing, by the computing system, a color value for the sampling pixel region using the selected mipmap level.

2. The method of claim 1, further comprising:
   determining that the selected mipmap level is defined by color texels; and
   selecting a first rendering logic configured to process color texels;
   wherein the color value is computed using the selected first rendering logic.

3. The method of claim 2, further comprising:
   determining a second sampling pixel region within the texture;
   selecting, from the mipmap levels, the second mipmap level defined by distance-field texels based on a size of the second sampling pixel region and a size of each of the distance-field texels in the second mipmap level;
   selecting a second rendering logic configured to process distance-field texels; and
   computing a second color value for the second sampling pixel region using the selected second rendering logic and the second mipmap level.

4. The method of claim 1, wherein the selected mipmap level is selected based on a ratio between the size of the sampling pixel region and the size of each texel in the selected mipmap level.

5. The method of claim 1, wherein the first mipmap level defined by color texels has a lower resolution than the second mipmap level defined by distance-field texels.

6. The method of claim 1, wherein the first mipmap level defined by color texels has a lowest resolution in the mipmap levels and the second mipmap level defined by distance-field texels has a highest resolution in the mipmap levels.

7. The method of claim 1, wherein segments of two edges appearing in the first mipmap level are separated by less than two of the color texels.

8. The method of claim 1, further comprising:
generating the mipmap levels using the texture.

9. A system comprising:
one or more processors; and
one or more computer-readable non-transitory storage media coupled to one or more of the processors and comprising instructions operable when executed by one or more of the processors to cause the system to:
determine a sampling pixel region within a texture, wherein the texture is associated with mipmap levels having different resolutions of the texture, wherein the mipmap levels include at least a first mipmap level defined by color texels and a second mipmap level defined by distance-field texels;
select one of the mipmap levels based on a size of the sampling pixel region and a size of a texel in the selected mipmap level; and
compute a color value for the sampling pixel region using the selected mipmap level.

10. The system of claim 9, wherein the processors are further operable when executing the instructions to:
determine that the selected mipmap level is defined by color texels; and
select a first rendering logic configured to process color texels;
wherein the color value is computed using the selected first rendering logic.

11. The system of claim 10, wherein the processors are further operable when executing the instructions to:
determine a second sampling pixel region within the texture;
select, from the mipmap levels, the second mipmap level defined by distance-field texels based on a size of the second sampling pixel region and a size of each of the distance-field texels in the second mipmap level;
select a second rendering logic configured to process distance-field texels; and
compute a second color value for the second sampling pixel region using the selected second rendering logic and the second mipmap level.

12. The system of claim 9, wherein the selected mipmap level is selected based on a ratio between the size of the sampling pixel region and the size of each texel in the selected mipmap level.

13. The system of claim 9, wherein the first mipmap level defined by color texels has a lower resolution than the second mipmap level defined by distance-field texels.

14. The system of claim 9, wherein the first mipmap level defined by color texels has a lowest resolution in the mipmap levels and the second mipmap level defined by distance-field texels has a highest resolution in the mipmap levels.

15. One or more computer-readable non-transitory storage media embodying software that is operable when executed by one or more processors to:
determine a sampling pixel region within a texture, wherein the texture is associated with mipmap levels having different resolutions of the texture, wherein the mipmap levels include at least a first mipmap level defined by color texels and a second mipmap level defined by distance-field texels;
select one of the mipmap levels based on a size of the sampling pixel region and a size of a texel in the selected mipmap level; and
compute a color value for the sampling pixel region using the selected mipmap level.

16. The media of claim 15, wherein the one or more processors are further operable when executing the instructions to:
determine that the selected mipmap level is defined by color texels; and
select a first rendering logic configured to process color texels;
wherein the color value is computed using the selected first rendering logic.

17. The media of claim 16, wherein the one or more processors are further operable when executing the instructions to:
determine a second sampling pixel region within the texture;
select, from the mipmap levels, the second mipmap level defined by distance-field texels based on a size of the second sampling pixel region and a size of each of the distance-field texels in the second mipmap level;
select a second rendering logic configured to process distance-field texels; and
compute a second color value for the second sampling pixel region using the selected second rendering logic and the second mipmap level.

18. The media of claim 15, wherein the selected mipmap level is selected based on a ratio between the size of the sampling pixel region and the size of each texel in the selected mipmap level.

19. The media of claim 15, wherein the first mipmap level defined by color texels has a lower resolution than the second mipmap level defined by distance-field texels.

20. The media of claim 15, wherein the first mipmap level defined by color texels has a lowest resolution in the mipmap levels and the second mipmap level defined by distance-field texels has a highest resolution in the mipmap levels.

* * * * *